(12) United States Patent
Mimura

(10) Patent No.: US 12,167,146 B2
(45) Date of Patent: *Dec. 10, 2024

(54) IMAGE CAPTURING APPARATUS, SYSTEM, AND METHOD

(71) Applicant: CANON KABUSHIKI KAISHA, Tokyo (JP)

(72) Inventor: Toshihiko Mimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 17/678,068

(22) Filed: Feb. 23, 2022

(65) Prior Publication Data

US 2022/0182539 A1 Jun. 9, 2022

Related U.S. Application Data

(63) Continuation of application No. 15/982,065, filed on May 17, 2018, now Pat. No. 11,317,019.

(30) Foreign Application Priority Data

May 25, 2017 (JP) .................................. 2017-103905
Mar. 15, 2018 (JP) .................................. 2018-048137

(51) Int. Cl.
*H04N 23/80* (2023.01)
*G06F 16/23* (2019.01)
(Continued)

(52) U.S. Cl.
CPC ............. *H04N 23/80* (2023.01); *G06F 16/23* (2019.01); *G06F 16/5866* (2019.01);
(Continued)

(58) Field of Classification Search
CPC ........ H04N 23/80; H04N 7/185; H04N 7/188; G06F 16/23; G06F 16/5866; G06K 7/10861; G06K 7/1093
See application file for complete search history.

(56) References Cited

U.S. PATENT DOCUMENTS 11,317,019 B2 * 4/2022 Mimura ................. H04N 23/61
2004/0204083 A1 10/2004 Watanabe et al.
(Continued)

FOREIGN PATENT DOCUMENTS

CN 102968902 A 3/2013
CN 204156985 U 2/2015
(Continued)

OTHER PUBLICATIONS

Mar. 1, 2022 Office Action in Japanese Patent Application No. 2018-048137.
(Continued)

*Primary Examiner* — Twyler L Haskins
*Assistant Examiner* — Fayez A Bhuiyan
(74) *Attorney, Agent, or Firm* — Venable LLP

(57) ABSTRACT

An image capturing apparatus includes an image capturing portion, a controller to perform image processing to obtain a feature value from image data, and a storage device to accumulate the image data. In an image capturing period of capturing an image of the target object by the image capturing portion, the controller transmits a result of the image processing to a data management server while accumulating the captured image data the storage device, while in an image capturing suspension period of not performing image capturing, the controller transmits the image data accumulated in the storage device to the data management server.

33 Claims, 10 Drawing Sheets

(51) Int. Cl.
*G06F 16/58* (2019.01)
*G06K 7/10* (2006.01)
*H04N 7/18* (2006.01)

(52) U.S. Cl.
CPC ....... *G06K 7/10861* (2013.01); *G06K 7/1093* (2013.01); *H04N 7/185* (2013.01); *H04N 7/188* (2013.01)

(56) References Cited

U.S. PATENT DOCUMENTS

| | | |
|---|---|---|
| 2005/0044258 A1 | 2/2005 | Nakamura |
| 2006/0043193 A1 | 3/2006 | Brock |
| 2006/0184272 A1 | 8/2006 | Okazaki et al. |
| 2011/0074951 A1 | 3/2011 | Lehane et al. |
| 2014/0316616 A1 | 10/2014 | Kugelmass |
| 2015/0363662 A1 | 12/2015 | Cho et al. |
| 2016/0012577 A1 | 1/2016 | Oka et al. |
| 2016/0039436 A1 | 2/2016 | Bhagwatkar et al. |
| 2016/0078759 A1* | 3/2016 | Nerayoff ............... G08G 1/133 701/3 |
| 2018/0041733 A1* | 2/2018 | Saptharishi ............ H04N 7/185 |

FOREIGN PATENT DOCUMENTS

| | | |
|---|---|---|
| CN | 106453570 A | 2/2017 |
| CN | 106572326 A | 4/2017 |
| JP | 2004-333446 A | 11/2004 |
| JP | 2005-135303 A | 5/2005 |
| JP | 2009-218933 A | 9/2009 |
| JP | 2013-158889 A | 8/2013 |
| JP | 2016-001768 A | 1/2016 |
| KR | 10-2006-0087732 A | 8/2006 |

OTHER PUBLICATIONS

Oct. 19, 2018 European Search Report in European Patent Appln. No. 18170376.0.
Jul. 22, 2020 Chinese Official Action in Chinese Patent Appln. No. 201810510097.9.
Sep. 23, 2020 Korean Official Action in Korean Patent Appln. No. 10-2018-0056847.
May 8, 2021 Chinese Official Action in Chinese Patent Appln. No. 201810510097.9.
Nov. 3, 2021 Chinese Official Action in Chinese Patent Appln. No. 201810510097.9.

* cited by examiner

FIG.9

|  L1 | L2 | L3 | L4 | L5 | LD1 |

```
Apr 24 08:35:50 camera-0001 ID00000011 LOGCODE LOGDATAPTR
Apr 24 08:35:51 camera-0001 ID00000012 LOGCODE LOGDATAPTR
Apr 24 09:01:49 camera-0002 ID00000049 LOGCODE LOGDATAPTR
Apr 24 09:01:51 camera-0004 ID00000023 LOGCODE LOGDATAPTR
Apr 24 09:03:29 camera-0001 ID00000013 LOGCODE LOGDATAPTR
Apr 24 09:03:31 camera-0001 ID00000014 LOGCODE LOGDATAPTR
           :              :           :          :          :
```

FIG.10

```
              L1           L2           L3           L6
                                                                    LD1
Apr 24 08:35:49 camera-0001 ID00004440 IMG_117115
Apr 24 08:35:50 camera-0001 ID00000011 LOGCODE  LOGDATAPTR
Apr 24 08:35:50 camera-0001 ID00004441 IMG_117116
Apr 24 08:35:50 camera-0001 ID00004442 IMG_117117
Apr 24 08:35:50 camera-0001 ID00004443 IMG_117118
        :            :           :          :
```

IMAGE CAPTURING APPARATUS, SYSTEM, AND METHOD

BACKGROUND OF THE INVENTION

Field of the Invention

The present invention relates to an image capturing apparatus configured to perform image processing of obtaining a feature value from image data obtained by image capturing and to transmit the obtained image data to the outside, and also relates to a system including the image capturing apparatus.

Description of the Related Art

In recent years, internet of things (IoT) has spread also in the field of factory automation (FA). For example, a production device management system including a data management server that collects information from components of a production device is known. In a production device management system of this kind, for example, the data management server analyzes data collected by a method such as deep learning, and there is an attempt to use the result of analysis for prediction maintenance of predicting abnormality of the production device and to analyze the cause or tendency of a trouble when the trouble occurs. For such analysis, image information of a surveillance camera and an image inspection apparatus is useful, and a configuration of collecting image data obtained by these apparatuses by a data management server and using the image data for the management of the production device has been proposed in, for example, Japanese Patent Laid-Open No. 2016-1768 and Japanese Patent Laid-Open No. 2004-333446 shown below.

However, there is a problem that image information occupies a large communication bandwidth when being communicated through a network. In IoT big data processing of recent years, the amount of communicated data has increased dramatically. Therefore, building a wired or wireless network interface (network I/F) that connects to a data management server or the like has become difficult. For example, the increase in the amount of communicated data causes various problems such as increase in the cost and size of an apparatus accompanied by increase in the amount of wiring, and, in the case of wireless communication, insufficiency of number of channels.

Meanwhile, technology has advanced immensely in these years, and an image capturing apparatus such as a so-called smart camera that not only simply performs image capturing but also has a processing capability of performing image processing or image analysis on image data obtained by image capturing has appeared. For example, Japanese Patent Laid-Open No. 2013-458889 shown below discloses a production system in which a robot is controlled by directly transmitting information based on image processing on captured image data from a smart camera that captures an image of an operation area of the robot to a robot control apparatus or the like.

A smart camera of this kind can possibly use a built-in I/F capable of performing high-speed communication of image data via near-field high-speed communication without being affected by external disturbance, at low power consumption, and easily. In addition, a network between a smart camera and a control apparatus of a production system can be realized by a general local area network: general LAN or wireless LAN that is low-cost such as 100 BASE or 1000 BASE because it suffices as long as a result of image processing not including a large amount of information is transmitted. In addition, the amount of data transmitted from the camera is reduced greatly, and thus the communication load on a management server that performs high-load processing such as big data processing is reduced.

In this manner, in the case where a smart camera is used for production management, the production cost and network cost of each device can be reduced, and there is a possibility that it becomes easier to reduce the overall size and weight of a production management system. In addition, part of processing conventionally performed by the management server can be performed by the smart camera, and there is a possibility that advanced production management, in which production devices and workpieces of many kinds should be quickly identified, can be realized.

However, in the production system including the smart camera described above, the following problem arises in the case of building a production device management system.

A smart camera generates processed information obtained by image processing, a result of analysis or diagnosis based on image processing, or the like. Therefore, although a trouble that has occurred during a normal operation of the production system or a trouble within an expected range can be addressed, the information lacks many elements as information for analyzing an unexpected trouble. For example, there is a case where the information obtained by image capturing by the camera includes information other than a processed image of a workpiece and a defect of the image processing or the cause of the defect can be revealed by a person just looking at the entirety of the image at the time of occurrence of the trouble. In contrast, in the case where only an image processing result is provided, it is difficult to identify the defect of processing and it is also very difficult to estimate the cause of the detect. In addition, for image processing performed in a camera, image processing parameters for adjusting the image processing are needed, and generally, these parameters need to be adjusted in accordance with the temporal change of lighting and an image capturing apparatus, and sudden change in the color of the workpiece. For this adjustment, for example, an original captured image, in other words, a raw captured image that has not been processed or compressed is needed in some cases.

In addition, there is a case where more detailed information is needed when defect or abnormality of a workpiece from a result of image processing during a normal operation of the production system. In such a case, a raw captured image that has not been processed or compressed is sometimes needed.

In such a circumstance as described above, an original or raw captured image obtained by capturing an image of a production device or a workpiece by a smart camera is sometimes needed for, for example, addressing an unexpected trouble, adjusting the camera, or addressing defect or abnormality of a workpiece that has been detected. Therefore, ideally, a configuration in which not only a processing result is transmitted from a smart camera but also an original or raw captured image obtained by the smart camera is logged in a storage device such as a hard disk disposed in a network is desired. However, the size of original or raw image data obtained by the smart camera as described above is large, and there is a case where all pieces of captured image data are transmitted is not practical. For example, in the case where the overall network of the production management system is accelerated in order to let the smart camera communicate a large amount of image data at a high speed, there is a possibility that the above-described merit of using a smart camera is cancelled.

In order to solve the problem described above, reducing the size of the image data or the size of communicated image data can be considered. For example, a method of cutting out a needed part of image data as in Japanese Patent Laid-Open No. 2016-1768 and a configuration of providing an image compression portion such as a joint photographic experts group encoder: JPEG encoder, in other words, a JPEG engine, in a smart camera can be considered. However, in the case of trying to achieve a high impression rate by an image compression method such as JPEG the image data is irreversibly compressed. In the case where irreversible compression is performed, it is impossible to restore image data before compression from JPEG image data obtained by compression. Therefore, in a system of transmitting irreversibly-compressed image data from a camera to a server, the same data as a non-compressed RAW format image used in the camera cannot be restored from image data remaining in a management server or the like. Therefore, in some cases, it is difficult to finely adjust, for example, image parameters described above.

In addition, although cutting out image data can reduce the amount of information of the image data, the size of the cut out image data is still large compared with the case of performing image compression, and thus cutting out the image data does not reduce the network cost greatly. In addition, in the case where a part needed for target processing does not remain in the cut out image region, the adjustment of image parameters and analysis described above are almost impossible.

Further, a decompressing process is required if an image data is compressed via method such as JPEG and this decompressing can cause a problem in the response of the system. For example, accompanied by progress of IoT, the amount of data transmitted from each component of a production system to a management server is dramatically increasing, and thus transmitting a large chunk of information such as image data can greatly affect the data response of an IoT communication I/F.

That is, image data, Which is large data, needs to be communicated by using a large packet. However, a large packet occupies a communication resource while the packet is transmitted. If the communication resource is occupied by the large image data, communication of other information cannot be performed, and, as a result, there arises a problem that the control system cannot respond immediately while the packet is communicated even in the case where information with a higher priority has been generated. This problem is called decrease in data response. To be noted, although the data response can be secured by transmitting the image data divided into small packets, in this case, the communication efficiency of the image data decreases greatly, and another problem such as decrease in the performance of the production system that utilizes the image arises.

A production device management system including production device components and utilizing wireless communication is a typical example that causes the problem described above. In wireless communication, the number of channels that can be simultaneously used for communication is limited because communication frequencies are limited. Therefore, in wireless communication, another communication path cannot be secured by assigning a different channel in accordance with priority as necessary. This is because, if all channels are assigned to one production device system, interference occurs between the wireless communication and wireless communication of another production device that is adjacent, and the data response is further decreased. In addition, in a production system of this kind, a device that is convenient when used via wireless communication, requires quick data response, and has a higher priority of processing, such as an emergency stop panel, is disposed. In a production system including such a device as this emergency stop panel, a configuration of transmitting an image captured by a smart camera to an image recording management system via the same network as the network used by the device is not preferred because this configuration degrades the response of another device.

SUMMARY OF THE INVENTION

According to one aspect of the present invention, an image capturing apparatus includes an image capturing portion configured to capture an image of a target object, a controller configured to perform image processing of obtaining a feature value from image data obtained by the image capturing portion, and a storage device configured to accumulate the image data. In an image capturing period of capturing an image of the target object by the image capturing portion, the controller transmits a result of the image processing to a data management server while accumulating the image data obtained by the image capturing portion in the storage device. In an image capturing suspension period of not performing image capturing of the target object by the image capturing portion, the controller transmits the image data accumulated in the storage device to the data management server.

According to another aspect of the present invention, a system includes an image capturing apparatus having an image forming portion configured to capture an image of a target object, a controller configured to perform image processing of obtaining a feature value from image data obtained by the image capturing portion, and a storage device configured to accumulate the image data and a data management server configured to communicate with the image capturing apparatus. In an image capturing period of capturing an image of the target object by the image capturing portion, the controller transmits a result of the image processing to the data management server while accumulating the image data obtained by the image capturing portion in the storage device. In an image capturing suspension period of not performing image capturing of the target object by the image capturing portion, the controller transmits the image data accumulated in the storage device to the data management server.

According to another aspect of the present invention, a method of producing a product using a production apparatus includes a step of capturing an image of the product to be produced by the production apparatus by an image capturing apparatus, accumulating image data obtained by the image capturing apparatus in a storage device of the image capturing apparatus, performing image processing on the image data by a controller of the image capturing apparatus, and transmitting a result of the image processing to a data management server, the image capturing apparatus having an image capturing portion, the controller configured to perform image processing on the image data, and the storage device configured to accumulate the image data. The method also includes a step of producing the product by the production apparatus while monitoring a production state of the product by a production control apparatus on a basis of the result of image processing transmitted to the data management server, the image processing transmitted to the data management server having been performed on image data obtained by the image capturing apparatus in an image capturing period of capturing an image of the product by the image capturing apparatus. Further the method includes a step of transmitting the image data stored in the storage device to the data management server from the image capturing apparatus in an image capturing suspension period of not performing image capturing of the product by the image capturing apparatus.

Further features of the present invention will become apparent from the following description of exemplary embodiments with reference to the attached drawings.

BRIEF DESCRIPTION OF THE DRAWINGS

FIG. 9 is an explanatory diagram illustrating an example of an image processing result associated with ID information transmitted from a smart camera in an image capturing period in the first or second exemplary embodiment.

FIG. 10 is an explanatory diagram of image data associated with the ID information transmitted from a smart camera in an image capturing suspension period in the first or second exemplary embodiment.

DESCRIPTION OF THE EMBODIMENTS

Figure 1:
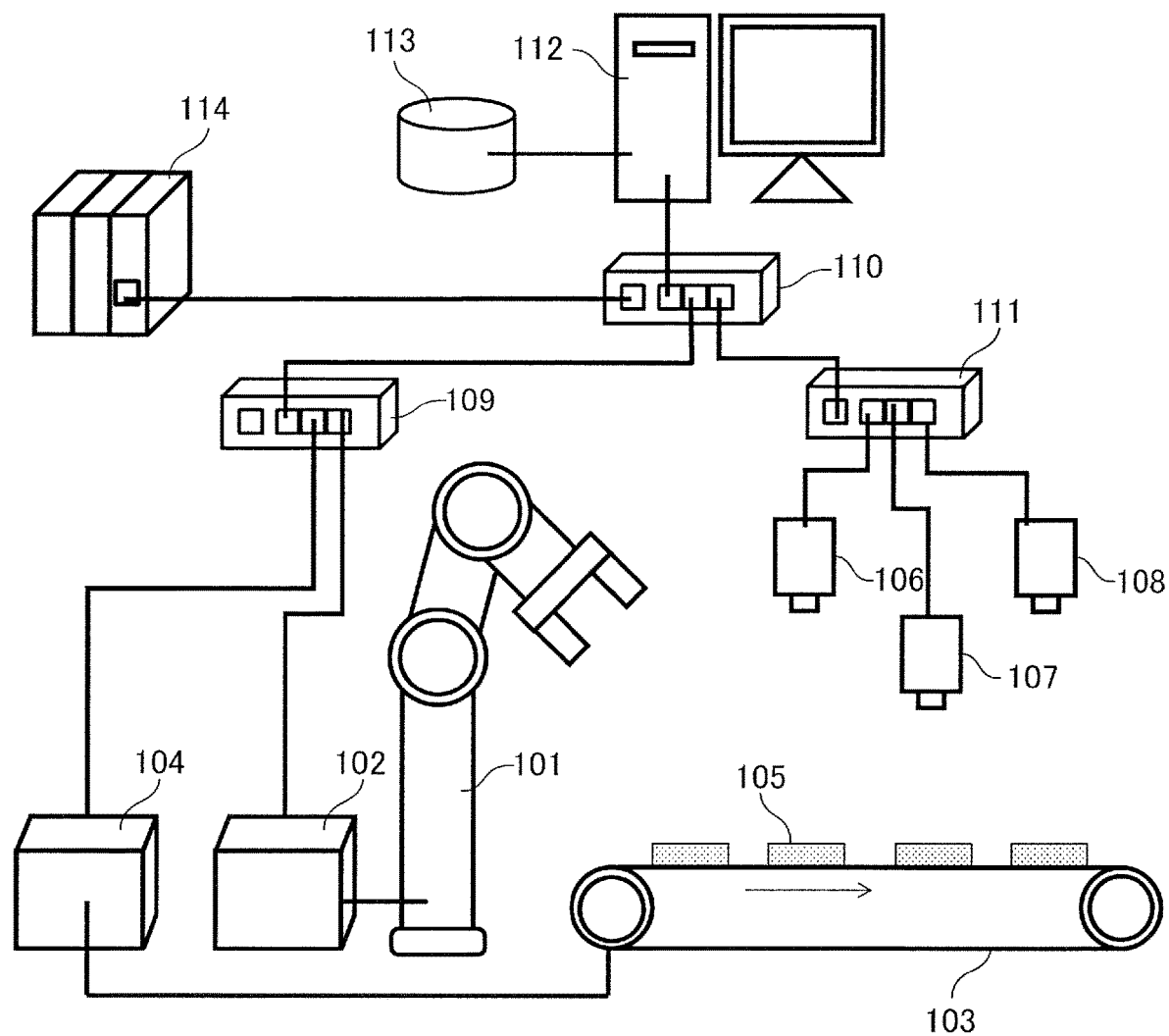
FIG. 1 is an explanatory diagram illustrating an exemplary configuration of a production system of a first exemplary embodiment of the present invention.

Exemplary embodiments of the present invention will be described below with reference to attached drawings. To be noted, the configurations shown below are merely examples, and, for example, details thereof can be appropriately modified by one skilled in the art within the gist of the present invention. In addition, numerical values shown in the exemplary embodiments are merely shown for reference and should not limit the present invention.

A production system shown below includes an image capturing apparatus including an image capturing portion, an image processing portion, and a storage device. The image capturing portion captures an image of a target object such as a production device or a workpiece. The image processing portion performs image processing on image data obtained by the image capturing portion. The storage device accumulates the image data. This image capturing apparatus corresponds to, for example, a stereo smart camera 106, 107, 108, or 403 including a camera 206, 206a, or 206b as the image capturing portion and a smart camera program 203 as the image processing portion. In addition, the image capturing apparatus can be configured as an IoT device including the image capturing portion and the image processing portion described above. This image capturing apparatus includes an internal storage 208 or 609 as the storage device. In addition, the production device corresponds to, for example, a robot arm 101 or 401 or a conveyance apparatus 103 in the exemplary embodiments described below.

In the exemplary embodiments described below, in an image capturing period of performing image capturing by the image capturing portion, the image capturing apparatus associates an image processing result obtained by the image processing portion from image data obtained by the image capturing portion with ID information and transmits the image processing result to a data management server 112 while accumulating the image data in the storage device. In addition, in an image capturing suspension period of not performing image capturing by the image capturing portion, the image capturing apparatus associates the image data accumulated in the storage device with the ID information and transmits the image data to the data management server 112.

In the exemplary embodiments described below, the ID information described above may include timekeeping information obtained by the image capturing apparatus from a timekeeping portion. In addition, the image capturing apparatus is capable of communicating with the data management server 112 or a timekeeping server such as a network time protocol (NTP) server different from the data management server 112 via a network time setting protocol to set the time of the timekeeping portion. In addition, the ID information described above may include a process management number, identification information, or the like. The process management number is used for controlling a production device. The identification information is used for identifying a production device or a workpiece handled by the production device.

In the exemplary embodiments described below, different networks can be used for communication respectively in the image capturing period and the image capturing suspension period described above. For example, in the image capturing period, the image capturing apparatus transmits the image processing result associated with the ID information to the data management server via a wireless network. In addition, in the image capturing suspension period, the image capturing apparatus associates the image data accumulated in the storage device with the ID information and transmits the image data to the data management server via a wired network.

In addition, a configuration in which the image capturing apparatus is placed on a cradle and is connected to the wired network via the cradle in the image capturing suspension period can be employed. This cradle may be further used such that the image capturing apparatus paced on the cradle is charged via the cradle in the image capturing suspension period. In addition, the operation of placing the image capturing apparatus on the cradle may be performed by a production device, for example, a robot arm 401. For example, when transitioning to the image capturing suspension period, the robot arm 401 places the image capturing apparatus on the cradle.

In addition, the data management server 112 is capable of analyzing an image processing result and/or image data transmitted from the image capturing apparatuses 106 to 108 by using, for example, deep learning processing, and is capable of updating a control program and/or a control parameter of a production device and/or an image capturing apparatus on the basis of an analysis result thereof.

To be noted, although a controller is divided into a control apparatus 114 serving as a production control apparatus and the data management server 112 including an external recording device 113 in a configuration exemplified below, this is merely an example and the configuration can be arbitrarily modified by one skilled in the art. For example, the data management server 112 and the control apparatus 114 serving as a production control apparatus may be integrated and disposed as a single control server or management server. In addition, the external recording device 113 may be provided in the system as a device such as a network attached storage (NAS) separate from the data management server 112.

First Exemplary Embodiment

Figure 2:
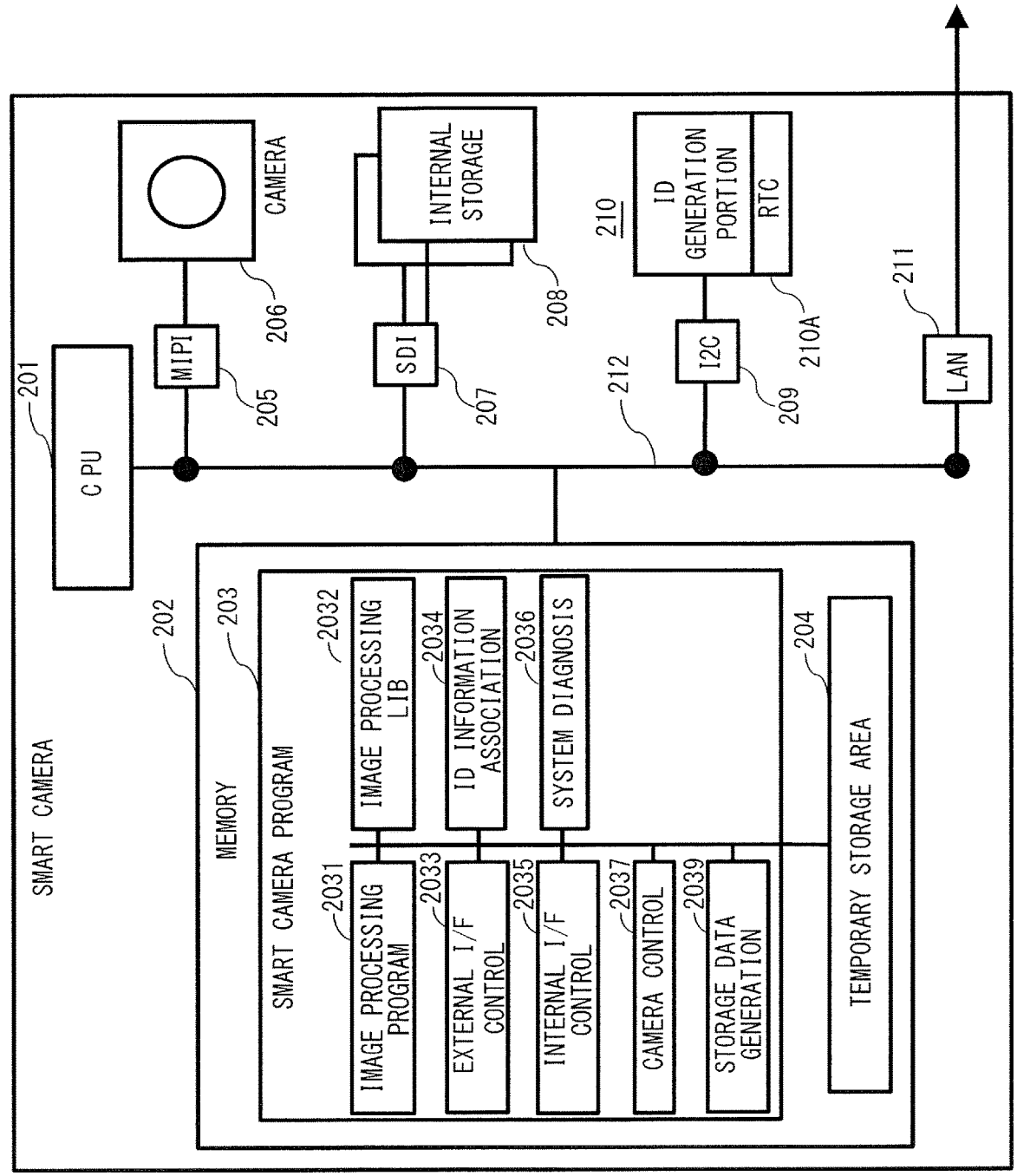
FIG. 2 is an explanatory diagram illustrating a configuration of a smart camera of FIG. 1.
Figure 3:
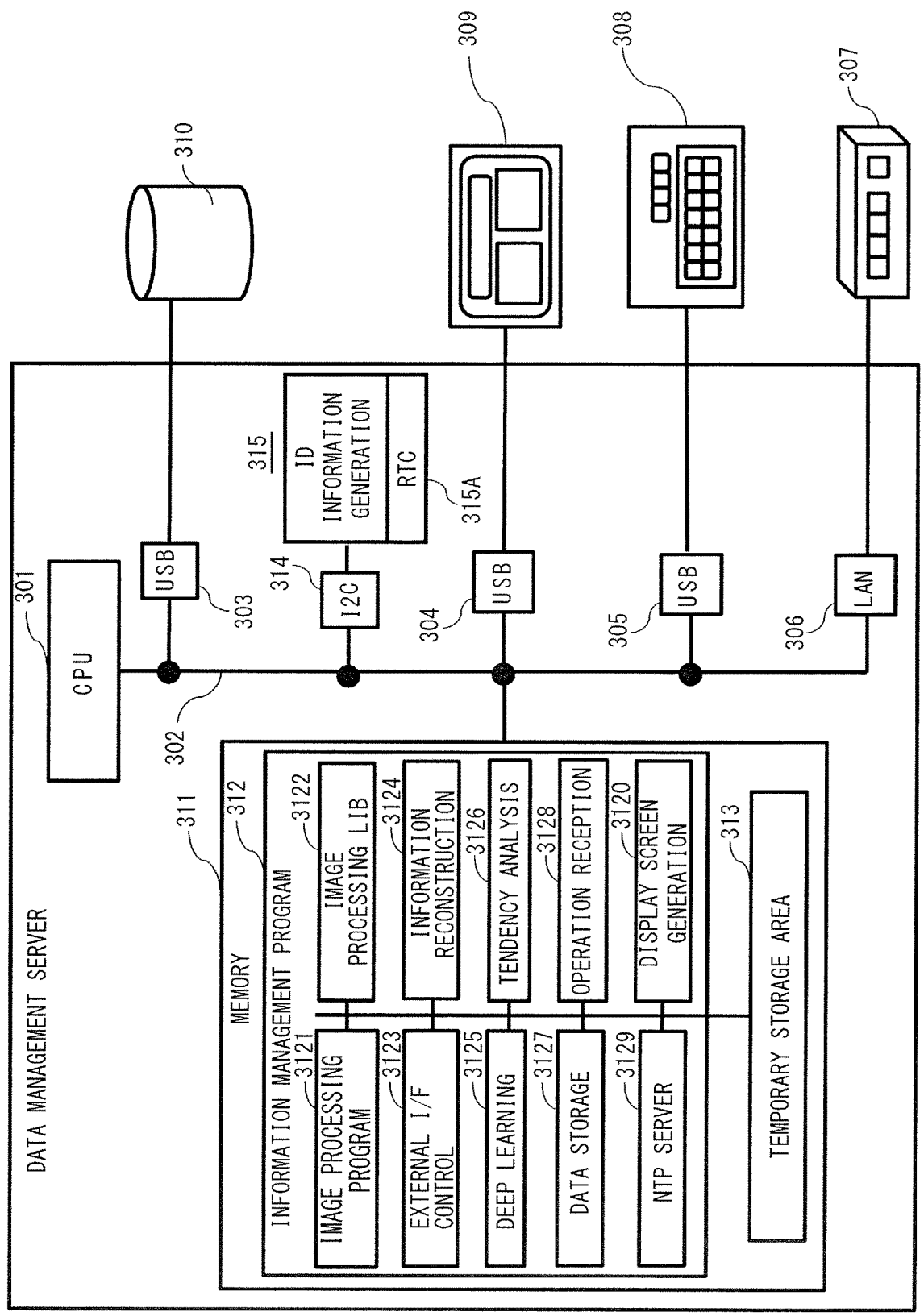
FIG. 3 is an explanatory diagram illustrating a configuration of a data management server of FIG. 1.

FIGS. 1 to 3 illustrate a configuration of a production system according to a first exemplary embodiment. FIG. 1 illustrates an overall configuration of the production system. The production system illustrated in FIG. 1 includes the data management server 112 connected to the external recording device 113 having a large capacity.

In addition, the production system of FIG. 1 includes a robot arm 101 and a conveyance apparatus 103. The robot arm 101 operates and conveys, for example, a workpiece 105, as a production device constituting a production line. Examples of the conveyance apparatus 103 include a conveyer and an X-Y stage. The robot arm 101 and the conveyance apparatus 103 are respectively controlled by a robot arm control apparatus 102 and a conveyance control apparatus 104 to realize a predetermined production process.

The robot arm control apparatus 102 and the conveyance control apparatus 104 are configured as, for example, so-called IoT devices that have some intelligent control function and are capable of cooperating with another device via network communication.

In addition, in the first exemplary embodiment, an IoT device refers to a device that includes an external I/F configured to connect to the data management server 112 and is at least capable of transmitting output information of various sensors disposed in a device controlled by the IoT device and a processing result thereof to the data management server 112. In this definition, the smart cameras 106, 107, and 108 that will be described later are IoT devices capable of transmitting image data obtained by an image sensor or an image processing result thereof to the data management server 112.

For example, the robot arm control apparatus 102 controls the robot aim 101, and has a function of transmitting various robot information such as temperatures of motors and encoders included in the robot arm 101 to the data management server 112. In addition, the smart cameras 106, 107, and 108 that are IoT devices, the robot arm control apparatus 102, and the conveyance control apparatus 104 are capable of generating ID information that can be used, for example, can be associated with other information, in the data management server 112.

The robot arm control apparatus 102 and the conveyance control apparatus 104 serving as production devices are imaged, or monitored, by the smart cameras 106 to 108 serving as image capturing apparatuses. Although the smart cameras 106 to 108 are illustrated above the conveyance control apparatus 104 in FIG. 1 for the sake of convenience, these cameras are disposed at arbitrary positions to monitor or image production states on the production line. For example, one or more of the smart cameras 106 to 108 may be disposed in an operation area of the robot arm 101 or of another robot.

The smart cameras 106 to 108 each include an internal storage 208 that stores image data obtained by a camera 206 serving as an image sensor. In addition, the smart cameras 106 to 108 each include a smart, camera program 203 serving as an image processing portion that performs predetermined image processing on the image data obtained by the camera 206 serving as an image sensor. Details of the configurations of the smart cameras 106 to 108 will be described later with reference to FIG. 2.

In the production system of FIG. 1, the data management server 112 is connected to the robot arm control apparatus 102, the conveyance control apparatus 104, and the smart cameras 106 to 108 respectively via wired LAN hubs 109, 110, and 111. In the present exemplary embodiments, the wired LAN hubs 109 to 111 are, for example, hubs for IEEE 802.3 network, and it suffices as long as the hubs satisfy a relatively low-cost network standard such as 100 BASF or 1000 BASE.

In addition, the production system of FIG. 1 includes a control apparatus 114 that is, for example, a programmable logic controller (PLC) that controls all the production devices. This control apparatus 114 is also provided with a LAN port, and is connected to the robot arm control apparatus 102, the conveyance control apparatus 104, and the smart cameras 106 to 108 via the LAN port. That is, components of the production system of FIG. 1 are interconnected via a relatively low-cost single network built using the LAN hubs 109 to 111.

A production process in a production line of FIG. 1 is performed as briefly described below. For example, the control apparatus 114 causes the conveyance apparatus 103 to operate, and causes the smart cameras 106 to 108 to capture images of the workpiece 105. Then, the control apparatus 114 receives an image processing result from the smart cameras 106 to 108, and sends, in accordance with the received result, an instruction of needed production device control to the robot arm control apparatus 102 that is an IoT device.

In the smart camera 106, 107, or 108, in the image capturing period, image data obtained by the camera 206 is recorded in the internal storage 208 in a state of being associated with ID information. Then, an image processing result obtained by the smart camera program 203 serving as an image processing portion is transmitted to the control apparatus 114 and the data management server 112. The control apparatus 114 is capable of using this image processing result to control, for example, operation of the robot arm 101 and the conveyance apparatus 103 constituting a production line. In addition, the data management server 112 accumulates the image processing result associated with the ID information in, for example, the external recording device 113.

In a system constituted by IoT devices, ID information is used for associating information generated in the IoT devices or identifying an event corresponding to the information. Here, the ID information may be any ID information as long as the control apparatus 114 and the data management server 112 can be associated with information generated in the IoT devices, that is, the robot arm control apparatus 102, the conveyance control apparatus 104, and the smart cameras 106 to 108.

Typical examples of ID information include timekeeping information. Examples of timekeeping information include time information and date and time information. For example, in the case of using timekeeping information as the ID information, simultaneity and an order relationship on a timeline of a plurality of pieces of IoT information each associated with ID information or events corresponding thereto can be identified. However, in the case of using timekeeping information as the ID information, a timekeeping portion that keeps time of timekeeping information generated by the IoT device needs to be accurately synchronized, that is, the time thereof needs to be set accurately. To achieve this, for example, it can be considered that an IoT device, for example, a smart camera or a network camera communicates with the data management server 112 or a timekeeping server such as an NTP server different from the data management server 112 via a network time setting protocol to set the time. To achieve this, an NTP server daemon that provides an NTP service is executed in the data management server 112 or the control apparatus 114. Accordingly, the IoT devices and the smart cameras 106 to 108 can each include an unillustrated timekeeping device such as a real time clock RTC) 210A. In addition, the time is set by communicating with the data management server 112 or the control apparatus 114 via an NTP protocol at appropriate intervals. As a result of this, the time of each server and IoT device can be set highly precisely for a long period of time by an error of a subsecond order, and thus the reliability of the timekeeping information as the ID information can be maintained. To be noted, the format of timekeeping information data used for setting the time described above can be arbitrarily selected.

To be noted, also in the case where timekeeping information is used as ID information associated with various IoT information transmitted from the IoT devices, the timing of obtaining the timekeeping information is important. For example, it is desirable to use the timekeeping information used as the ID information, which should not be a time information such as the time of data transmission from the external I/F or the like, but should be the time of obtaining information originating the IoT information.

For example, as the ID information of the smart cameras 106 to 108, not timekeeping information or time information of the time of transmitting the image processing result after image processing, but time information of the time of providing an image capturing trigger to an image capturing portion in the smart camera is preferably used. This is because, in the present exemplary embodiment, the time of transmission of the image processing result with the timekeeping information serving as the ID information is delayed by the time required for image processing in the smart camera and the degree of delay varies depending on the content of processing and the image data.

In the system of FIG. 1, the same applies to ID information of other IoT devices than the smart cameras 106 to 108. In the case of using the timekeeping information as the ID information, basically timekeeping information or time information of the time of obtaining data originating the IoT information is used as the ID information.

According to the configuration described above, all pieces of IoT information generated in IoT devices can be managed in association via ID information that is, for example, time keeping information, and it becomes possible to perform advanced tendency analysis by using a method such as deep learning.

As another example of ID information, providing ID information as a barcode or the like on a workpiece or a tray carrying the workpiece can be considered. In this case, the barcode is read by the smart camera 106, information decoded from the barcode is transmitted and used as the ID information of IoT devices. This barcode can be used as identification information for identifying a workpiece handled by a production device or a working table or a tray thereof. In this case, for example, a command is transmitted from the data management server 112 to cause the smart cameras 106 to 108 to simultaneously read the barcode, and the result of reading is transmitted as an ID signal with the image processing result. As a result of this, the operation of a production device can be associated with each kind of predetermined workpieces.

In addition, it is possible that the smart cameras 106 to 108 cannot always read the barcode successfully. In this case, the first barcode data correctly obtained by a smart camera, for example the smart camera 106, can be used as the basis of the ID information. Further, the time of reading the barcode may be reset to 0 and time elapsed thereafter may be used in combination with the barcode data. As a result of this, an event of a production process related to a specific workpiece can be identified and associated by using relative time elapsed from a time of reading barcode data for identifying the workpiece.

As described above, the ID information is used for identifying various IoT data serving as event data of a production device, and, for example, timekeeping information and identification information of the workpiece obtained via a barcode can be used alone or in combination of a plurality of them. In addition, association of IoT data serving as event data of a production device can be also performed by the control apparatus 114 via a process management number or the like used for controlling the production devices. For example, in the case where the control apparatus 114 uses the timekeeping information and a process management number of a specific production control event associated with each other as the ID information, an image processing result of a smart camera, image data, and a specific production device can be associated with one another. To be noted, arbitrary information can be used as the ID information used for the IoT information as long as the ID information can be used by the server 112 or the control apparatus 114 for associating various IoT data serving as production events, the image processing result of a smart camera, and an image before image processing.

Next, the smart cameras 106 to 108 and the data management server 112 illustrated in FIG. 1 will be respectively described with reference to FIGS. 2 and 3.

FIG. 2 illustrates a configuration of each of the smart cameras 106 to 108 each corresponding to an image capturing apparatus of the present exemplary embodiment. Components of the smart camera 106, 107, or 108 of FIG. 2 are disposed with a central processing unit (CPU) 201. A bus line 212 constituted by various signal lines such as a data bus and an address bus managed by the CPU 201 is connected to a memory 202, the camera 206, the internal storage 208, an ID generation portion 210, and a LAN port 211.

The camera 206 serving as an image capturing portion of the image capturing apparatus includes, for example, an image capturing lens and an image sensor, and is connected to the bus line 212 via, for example, a mobile industry processor interface: MIPI 205 for input and output of image data obtained by image capturing. The MIPI 205 is an interface of a camera device used for, for example, a mobile phone, and can constitute a camera interface with a low power consumption and a low cost although this interface is not suitable for long-distance communication.

The internal storage 208 including an embedded multimedia card: eMMC, an SD memory, or the like is connected to the bus line 212 via, for example, a serial digital interface: SDI 207. Although the SDI 207 is not suitable for connection to an external device or the like, the SDI 207 can constitute an interface with low power consumption, and is suitable for a smart camera or the like.

In the present exemplary embodiment, the internal storage 208 is, for example, used for accumulating uncompressed image data obtained by the camera 206 in an image capturing period of an appropriate length without transmitting the image data via a network. In the present exemplary embodiment, the image data accumulated in the internal storage 208 during the image capturing period is transmitted to the data management server 112 in an image capturing suspension period. Therefore, although the storage capacity of the internal storage 208 can be arbitrarily set, the storage capacity is set to be large enough to, for example, store all the uncompressed image data obtained by the camera 206 in an image capturing period normally expected. Although the storage capacity of the internal storage 208 varies depending on the specification of the production system, it is relatively easy to obtain a product of a size as large as 100 GB even for the case of a storage medium such as an SD memory.

The ID generation portion 210 is configured to generate one or a plurality of type of ID information described above, and, for example, in the case where timekeeping information or time information is used, the ID generation portion 210 includes a timekeeping portion such as the RTC 210A. The ID generation portion 210 is connected to the bus line 212 via, for example, an inter-integrated circuit (I2C) interface 209. In the case of using an I2C interface, data can be input and outputby using two-wire wiring hardware, which requires relatively low cost, and the I2C interface has a capability enough to input and output data of a small size such as timekeeping information or time information. In addition, in the case of using a barcode or the like described above for the ID information, the ID generation portion 210 may be constituted by, for example, hardware that decodes the content of data from an image of a barcode captured by the camera 206 or software run by the CPU 201.

In the present exemplary embodiment, only the LAN port 211 is the external communication I/F of a smart camera, and the format of the LAN port 211 is used also for the IoT devices. That is, the same LAN backbone can be used for other IoT devices as well in time-sharing manner, and thus the amount of network wiring can be significantly reduced.

The memory 202 included in a smart camera and illustrated on the left side of FIG. 2 is constituted by a storage device such as a dynamic random access memory (DRAM) or a read-only memory (ROM). Internally, the memory 202 is roughly divided into a temporary storage area 204 and a smart camera program 203. The temporary storage area 204 temporarily stores images, data, and the like.

Among these, the smart camera program 203 is constituted by partial programs 2031 to 2039 including program modules, sub routines, and kernel services. The configurations and basic operations of these programs 2031 to 2039 will be described below.

When the power of the smart camera is turned on, a system diagnosis program 2036 is booted up, and performs self-diagnosis of confirming presence or absence of malfunction of each component of the smart camera. If there is no problem as a result of the self-diagnosis, booting of the smart camera is notified to the control apparatus 114 and the data management server 112 by an external I/F control program 2033.

In response to the booting, for example, the NTP server operating in the data management server 112 transmits a command of adjusting time to the LAN port 211. Alternatively, a request for adjusting time may be transmitted to the NTP server of the data management server 112 or the control apparatus 114 from the smart camera of FIG. 2 as a part of an initial operation. By this NTP service, an ID information association program 2034 adjusts time of, for example, the RTC of the ID generation portion 210 via an internal I/F control program 2035. This time adjusting can be regularly performed with intervals of several minutes to several tens of minutes as led by the NTP server or the smart camera.

Then, the smart camera of FIG. 2 takes a stand-by state for a trigger signal from the control apparatus 114. In the present invention, a series of operations from the stand-by state to image capturing by the image sensor, image processing, and transmission of the result will be referred to as an image capturing period, and a period other than this will be referred to as an image capturing suspension period. In FIG. 1, a period in which the smart cameras 106 to 108 each capture an image of the workpiece 105, performs image processing, and transmits the image processing result is the image capturing period, and a period from transmitting the image processing result to receiving the next trigger signal is an image capturing suspension period. In addition, a period in which the supply of the workpiece 105 is stopped for some time for a reason such as maintenance or switching of workpiece and a period in which the system is stopped in response to an operation finishing command also correspond to the image capturing suspension period.

As the smart camera program 203, an image processing program 2031 that performs some different kinds of image processing in accordance with the content of inspection performed by the smart camera is installed. The image processing program 2031 is described so as to be executed by using a routine of an image processing LIB 2032 that is a basic image processing program. Here, LIB stands for library. The image processing LIB 2032 stores a plurality of image processing programs used for machine vision. These image processing programs used for machine vision perform processing of extracting a feature value from a captured image. Examples of the image processing programs used for machine vision include a program related to positional phase measurement that calculates a needed feature position from the captured image and a program related to inspection of extracting a needed feature value from a captured image buried in noise or the like. Further, specifically, representative examples of the former example include a program of pattern matching, pattern fitting, or the like, and representative examples of the latter example include a program that performs application of a median filter or blob analysis. The feature value extracted herein is a value to be used for controlling the robot arm 101 and the conveyance apparatus 103 and for quality determination of a workpiece. For example, the position of a predetermined shape serving as a mark, the position and orientation of a workpiece, or presence and absence of a scratch or a defect of the workpiece is used as the feature value.

The smart camera 106, 107, or 108 of FIG. 2, is provided with the camera 206 to capture an image of a target production device at a specific field angle and image capturing distance, and an image of the target production device is captured by the camera 206 in response to a trigger command from the control apparatus 114. This image capturing may be image capturing of one or a plurality of still images or image capturing of a moving image of a certain length. However, in the description below, the image capturing is image capturing of one still image for easier description.

When receiving the trigger command instructing image capturing from the control apparatus 114 via the external I/F control program 2033, the smart camera 2033 causes the ID generation portion 210 to generate ID information via the internal I/F control program 2035. Here, the ID generation portion 210 obtains timekeeping information corresponding to an image capturing timing as the ID information. The obtained ID information that is the time keeping information is stored in the temporary storage area 204 that is secured in, for example, a RAM. A camera control program 2037 transmits an image capturing start signal to the camera 206, and thus the camera 206 starts an image capturing operation.

Here, time lag of the external I/F, that is, the LAN port 211, and processing time of the image processing program occupies most of temporal delay factors in the smart camera. In the case of recent hardware and software, the time difference between storing the ID information in the temporary storage area 204 and transmission of the image capturing start signal to the camera 206 is almost 0, and thus this time difference can be considered almost neglible.

Image data obtained by the camera 206 is temporarily transferred to the temporary storage area 204 by the camera control program 2037. Subsequently, the image processing program 2031 performs predetermined image processing, and the image processing result thereof is stored in the temporary storage area 204.

The ID information and the image processing result stored in the temporary storage area 204 as described above are transmitted to the control apparatus 114 and the data management server 112 via the LAN port 211 under the control of the external I/F control program 2033. The control apparatus 114 is capable of controlling commands to the robot arm control apparatus 102 and the conveyance control apparatus 104 by using the ID information and the image processing result. The data management server 112 accumulates, for example, the received ID information and image processing result in the external recording device 113.

In addition, in the smart camera of FIG. 2, the ID information and image data before image processing stored in the temporary storage area 204 is recorded in the internal storage 208 and takes again a stand-by state for a trigger signal under the control of the internal I/F control program 2035.

During an operation of a production device disposed in the production line, the smart camera of FIG. 2 repeats the operations described above, that is, the image capturing period, in accordance with an instruction from the control apparatus 114. Steps S12 to S15 of FIG. 8 respectively correspond to processes performed in accordance with the trigger from the control apparatus 114 in the image capturing period. Step S12 corresponds to generation of the ID information, step S13 corresponds to image capturing of the production device, step S14 corresponds to image processing, and step S15 corresponds to transmission of the ID information and the image processing result. The image processing result output from the smart camera is transmitted to the control apparatus 114 via hubs 111 and 110. The control apparatus 114 transmits control signals to the robot arm control apparatus 102 and the conveyance control apparatus 104 to control the operations of the robot arm 101 and the conveyance apparatus 103 in accordance with the image processing result. For example, in the case where the feature value to be obtained by the smart camera is a value related to the quality determination of the workpiece and to the position, the control apparatus 114 controls the robot arm 101 and the conveyance apparatus 103 to remove a workpiece determined as having a bad quality.

The control apparatus 114 repetitively performs processing of transmitting control signals corresponding to respective roles of the IoT devices in the production system such as the robot arm control apparatus 102 and the conveyance control apparatus 104 via a LAN, and thus a production process by the devices progresses. In addition, in response to these instructions from the control apparatus 114, the ID information and IoT data are transmitted from the IoT devices such as the robot arm control apparatus 102 and the conveyance control apparatus 104 as described above and are accumulated and stored in the data management server 112. Here, the IoT data is a message.

The control apparatus 114 transmits an operation termination command to the IoT devices 102 and 104 and the smart cameras 106 to 108 when terminating the operation of the production line or the production devices constituting the production line. As a result of this, an image capturing mode, in other words, the image capturing period, of the smart cameras 106 to 108 is terminated. To be noted, in addition to the case of stopping the production line, the image capturing period may be also similarly terminated in the case where, for example, the smart cameras 106 to 108 are required to be replaced.

Figure 8:
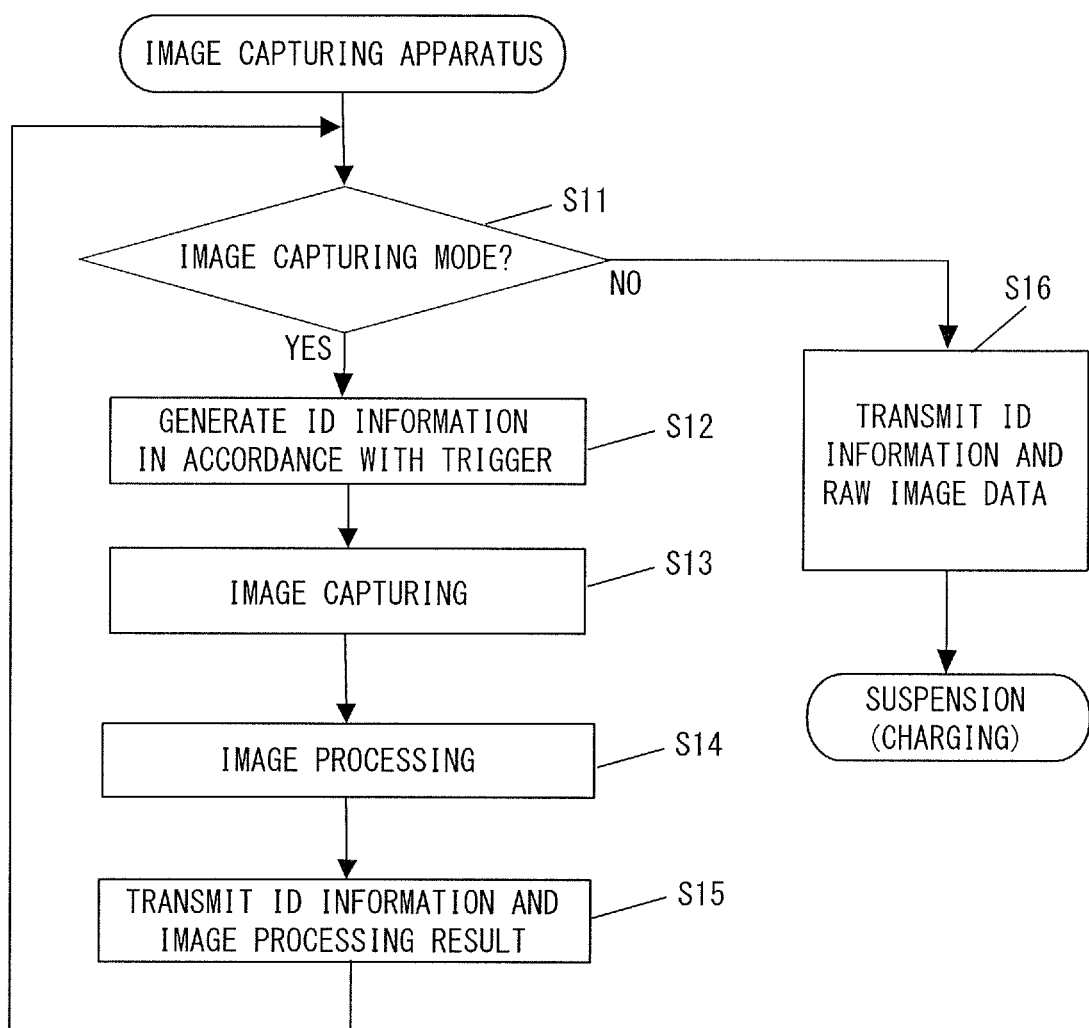
FIG. 8 is a flowchart illustrating the summary of an operation of a smart camera in the first or second exemplary embodiment.

The smart camera recognizes that the image capturing period has been terminated in the case where, for example, the smart camera has received a command to transmit the image data or an operation termination command via the external control program 2033 in a stand-by state for the trigger in step S11 of FIG. 8. That is, according to the command described above, the smart camera recognizes that the image capturing period has been terminated and the image capturing suspension period has been started. That is, the process proceeds from step S11 to step S16.

Step S16 of FIG. 8 corresponds to the image capturing suspension period of the smart camera. Switching to the image capturing suspension period can be performed in response to a command or the like from the control apparatus 114 to the smart camera.

When receiving a command to transmit the image data from the control apparatus 114, the smart camera enters the image capturing suspension period, transmits an image data transmission start command to the data management server 112, and thus checks whether or not the data management server 112 is ready. If it is confirmed that the data management server 112 is ready, the smart camera 106, 107, or 108 starts the relevant data transmission, in which ID information and image data associated therewith that is obtained by image capturing and accumulated in the internal storage 208 during the operation of the production devices are sent to the data management server 112. Regarding the image data to be transmitted, image data of a suitable size can be transmitted in accordance with the length of the image capturing suspension period. For example, during the capturing suspension period, it is possible to transmit image data obtained in one time of image capturing, or image data obtained in a plurality of times of image capturing.

At this time, ID information and a captured image that have already been transmitted are usually deleted from the internal storage 208 of the smart camera. However, it is possible to employ a configuration in which information is stored as long as the storage capacity of the internal storage allows and, if the internal storage is full, older images identified by their capturing information are sequentially deleted, to make a space to store newly recorded data.

To be noted, in the smart camera 106, 107, or 108 of FIG. 2, the image processing program 2031 requires an image processing parameter for image processing. This image processing parameter may be recorded in, for example, a program code of the image processing program 2031. In addition, a configuration in which the image processing parameter is stored in a storage area disposed in the internal storage 208 and is read each time the image processing program 2031 is booted may be employed. In addition, the image processing program 2031 and the image processing parameter can be remotely updated independently or together by transmission of a command and data transfer from the data management server. In the smart camera 106, 107, or 108, an update program corresponding to the update operation described above may be included in the smart camera program 203.

FIG. 3 illustrates an exemplary configuration of the data management server 112 used in the present exemplary embodiment. Components of the data management server 112 of FIG. 3 are disposed with a CPU 301 constituting a controller. A bus line 302 constituted by various signal lines such as a data bus and an address bus managed by the CPU 301 is connected to USB controllers 303 to 305 in addition to a memory 311.

Further, the data management server 112 of FIG. 3 includes a LAN controller 306 for connecting to the IoT devices and the smart cameras 106 to 108, and an ID information generation portion 315. The ID information generation portion 315 is connected to the bus line 302 via, for example, an I2C interface 314.

The USB controller 303 is connected to a nonvolatile storage device 310 that accumulates a large amount of IoT data. The nonvolatile storage device 310 can be constituted by a disk device such as a hard disk drive: HDD or a solid state drive: SSD. In addition, the nonvolatile storage device 310 may be connected to the USB controller 303 via a disk I/F such as SATA or small computer system interface: SCSI instead of a USB interface.

A display apparatus 309 is constituted by, for example, a display device such as a liquid crystal display: LCD for checking an operation state of devices, images, and the image processing result. An operation input apparatus 308 constitutes a user interface for, for example, an administrator of the production line, together with the display apparatus 309. This operation input apparatus 308 is constituted by a keyboard, a mouse, or another pointing device.

A LAN hub 307 is connected via the LAN controller 306. This LAN hub 307 may be the same as the LAN hub 110, or may be another hub used for connection of a network cable connecting to the LAN hub 110. Either way, network connection to the IoT devices 102 and 104 and the smart cameras 106 to 108 described above is built via the LAN hub 307.

The memory 311 is a recording memory constituted by a DRAM or a ROM, and, internally, the memory 311 can be roughly divided into a temporary storage area 313 and an information management program 312. The temporary storage area 313 temporarily stores an image, data, and the like.

Further, the information management program 312 is constituted by partial programs 3120 to 3129 including program modules, sub routines, and kernel services. The configurations and basic operations of these programs 3120 to 3129 will be described below.

The data management server 112 needs to be booted up earlier than the IoT devices and the smart cameras in the production line, and to operate continuously without a stop even while the production devices are not operating.

The data management server 112 extracts the timekeeping information by an NTP server program 3129 when recognizing a booting signal from the IoT devices and the smart cameras via an external I/F control program 3123. For example, master timekeeping information is extracted as standard ID information from an RTC 315A included in the ID information generation portion 315. Then, the timekeeping information serving as the standard ID information is transmitted to the IoT devices and the smart cameras to match ID information in the data management server 112 with ID information, in this case, timekeeping information, of the IoT devices and the smart cameras. This matching of timekeeping information serving as ID information can be performed at the time of newly recognizing booting of the IoT device 102 or 104 or the smart camera 106, 107, or 108 or at the time when a production operation start command is transmitted from the control apparatus 114. In addition, the matching can be performed when the continuous operation time has exceeded a predetermined time and a command has been transmitted from the data management server 112. Further, the matching may be performed in response to a request from the IoT devices 102 and 104 and the smart cameras 106 to 108.

As the ID information generated by this ID information generation portion 315, a measurement value of a counter that is incremented at regular timings or at each PLC step and can be used as a so-called tick or the like instead of the timekeeping information described above.

The information management program 312 includes a data storage program 3127 to successively record information transmitted from the IoT devices and smart cameras in the nonvolatile storage device 310 in response to the transmission. This data storage program 3127 is stored in the nonvolatile storage device 310 in a format in which the transmitted IoT information serving as data for various analyses can be searched for by using the ID information as a key item. The data storage program 3127 can be configured by using a known database engine capable of performing such database processing.

To be noted, since the ID information is timekeeping information corresponding to the time at which sensor information originating the IoT information is obtained in the present exemplary embodiment, the timekeeping information does not always reach the data management server 112 in the order of the corresponding time. Therefore, for example, data can be reconstructed by rearranging the data in the order of time on the basis of the ID information serving as the key information by an information reconstruction program 3124. To be noted, at this time, the entirety of the IoT data does not have to be subjected to sorting by the information reconstruction program 3124. For example, the ID information serving as the key is assigned with a corresponding data number, and is recorded in the nonvolatile storage device 310 in association therewith. In this case, the sorting of the data may be performed for the ID information and the data number associated therewith.

In a normal operation of the production line, for example, an operation tendency of each device can be analyzed by a tendency management program 3126 when all IoT information required for the analysis is in the nonvolatile storage device 310. According to the tendency management program 3126, for example, updating an image processing parameter, and a predictive maintenance operation of displaying and recording a warning for a device can be performed, thereby the production line can be dynamically controlled, and stable operation thereof can be realized. The tendency management program 3126 may include a manual program analysis portion, and, association with a production event and tendency analysis can be also performed for various IoT information by using deep learning processing 3125.

In addition, the data storage program 3127 of the data management server 112 is capable of obtaining image data serving as an image capturing result of a production device associated with the ID information transmitted from the smart camera 106, 107, or 108 in step S16 of FIG. 8 when the production device is not operating. This ID information and the raw image data is logged in, for example, the external recording device 113 in the configuration of FIG. 1. The ID information and the raw image data transmitted from the smart camera 106, 107, or 108 can be utilized as follows.

First, the ID information and raw image data can be used at the time when an unexpected event or a trouble whose cause is hard to reveal for the tendency management program 3126 occurs in the production device. As has been described above, the ID information in the data management server 112 is regularly matched with the ID information of the IoT devices and smart cameras. Therefore, raw image data that has been captured by the smart camera 106, 107, or 108 at the time of occurrence of the unexpected event and has not undergone image processing can be associated with information from the IoT devices 102 and 104 by using the ID information. For example, specifically, the temperature and an output value of an encoder of a motor included in a robot arm associated with the ID information corresponding to the time of occurrence of the unexpected event can be compared with the raw image data. According to this, an administrator of the production system can observe the state of the production device in the unexpected event closely from various angles, and thus the true cause of the event can be investigated.

In addition, the deep learning processing 3125 may be used for analysis of this kind. In the data management server 112 of FIG. 3, an image processing program 3121 and an image processing LIB 3122 equivalent to the image processing program 2031 and the image processing LIB 2032 included in each of the smart cameras 106 to 108 are disposed. Therefore, the tendency of information from the IoT devices and various image parameters can be analyzed by the deep learning processing 3125 by operating these. According to this, for example, what kind of event happens in the case of changing the image processing programs and image processing parameters of the smart cameras 106 to 108 can be simulated in advance. In addition, update such as partially changing the image processing program and image processing parameter can be also performed via the deep learning processing 3125. The image processing program and image processing parameter updated in this manner are transmitted to the smart camera 106, 107, or 108 via the LAN controller 306 as being led by an external I/F control program 3123. According to this, in the smart camera 106, 107, or 108, update equivalent to the case of the image processing program 2031 and the image processing LIB 2032 can be performed. In addition, not only the smart cameras 106 to 108, but also device control programs and control parameters thereof of the control devices 102 and 104 serving as other IoT devices of the production devices 101 and 103 may be updated.

That is, the data management server 112 is capable of analyzing the image processing result and/or image data transmitted from the smart cameras 106 to 108 by deep learning processing or the like, and is capable of updating a control program of the control devices 102 and 104 of the production device and the smart cameras 106 to 108 on the basis of the analysis result.

As another example, in the case where the image capturing period of transmitting the image processing result and the image capturing suspension period of transmitting the raw image data are alternately set, image processing can be performed on the raw image data in accordance with the image processing result and more detailed information can be obtained. For example, in the case of obtaining a feature value related to determination of quality of the workpiece as the image processing result, if the image processing result indicates a bad quality of the workpiece, detailed information of the workpiece is obtained from raw image data obtained right after this. Specifically, for example, by performing analysis by performing different image processing than the image processing in the smart camera, further details of the state determined as a bad quality can be obtained. This enables tracking the cause of the bad quality of the workpiece.

Here, FIG. 9 illustrates an example of an image processing result serving as IoT information associated with the ID information transmitted from the smart camera 106, 107, or 108 and logged in, for example, the external recording device 113, in the image capturing period described above corresponding to steps S11 to S15 of FIG. 8. In addition, FIG. 10 illustrates an example of image data serving as an image capturing result of a production device associated with the ID information, transmitted from the smart camera 106, 107, or 108, and logged in, for example, the external recording device 113, in the image capturing suspension period corresponding to step S16 of FIG. 8.

Each row of FIG. 9 corresponds to one record of image processing result data associated with a certain piece of ID information L1. This one record may be constituted by fields L2 to L5 in addition to a field L1 of ID information. To be noted, in FIG. 9, display in a readable text format similar to log data used in various operating systems is used for the illustration just for the sake of easier understanding. Therefore, the ID information and image processing result that are actually communicated may be in another format, for example, binary data described based on certain rules. The same applies to FIG. 10. In addition, FIG. 9 may be also considered as a screen in a log format that is displayed in a display screen of the display apparatus 309 of the data management server 112. The same applies to FIG. 10.

The field L1 of ID information of FIG. 9 is a field for displaying date and time, and, in the case of using timekeeping information as the ID information as in the present exemplary embodiment, this part corresponds to the ID information associated with the image processing result. The field L4 including LOGCODE corresponds to a result code or an error or warning code corresponding to the image processing result, and is actually expressed by some number or string. In the present exemplary embodiment, the configuration and operation described above can be implemented as long as the fields L1 and L4 of the image processing result record corresponding to the ID information and image processing result are transmitted. However, the example of FIG. 9 includes the field L2 for identifying the smart camera 106, 107, or 108, the field L3 of identification number, and the field L5 of a pointer to a detailed image processing result or a result of analysis performed by the data management server 112. Among these, smart camera identification information of the field L2 can be provided for the data management server 112 to identify the smart camera from which the record has been transmitted. The identification number of the field L3 may be generated by the data management server 112 as a serial number of the record.

Such a data number can be used as pointer data for the rearrangement of the IoT data described above.

In contrast, FIG. 10 represents image data serving as an image capturing result of a production device associated with the ID information, transmitted from the smart camera 106, 107, or 108, and logged in, for example, the external recording device 113, in the image capturing suspension period corresponding to step S16 of FIG. 8. Here, each row includes an unprocessed image data record or an image processing result data record LD1 transmitted from a specific one of the smart cameras, that is, camera-0001. This state of FIG. 10 is after sorting using the ID information, that is, the timekeeping information, as a key, and the same image processing result record LD1 as the record LD1 at the top row of FIG. 9 is disposed at the second row.

In FIG. 10, the fields L1, L2, and L3 respectively correspond to ID information, identification information of a camera, and a record number similarly to FIG. 9. In addition, a field L6 represents uncompressed image data, and, for example, a stream of uncompressed image data of formats such as TIFF, BMP, and PNM may be arranged in the position of the field L6 in a log file. Alternatively, for example, path names of image files stored as different files in the external recording device 113 may be arranged in the position of the field L6.

To be noted, in the case of using ID information such as a process management number obtained via a barcode as will be described later, the field L1 in FIGS. 9 and 10 may be used for the ID information. In addition, the field L3 of FIGS. 9 and 10 may be assigned for recording the ID information like the process management number.

As described above, the production management system of the present exemplary embodiment is capable of using analyzed image processing results of the smart cameras 106 to 108 serving as IoT information associated with ID information and using production management information fed back from the IoT devices 102 and 104. According to this, production management such as tendency analysis of the production devices 101 and 103 in operation and changing control parameters on the basis thereof can be performed regularly.

Further, for example, at the time of stopping the production line, the smart cameras 106 to 108 can be made to transition to the image capturing suspension period and transmit the raw image data obtained in the image capturing period and not having undergone image processing, and the raw image data can be accumulated and recorded in the external recording device 113, for example. As a result of this, more detailed data analysis can be performed by using not only the analyzed image processing result of the smart cameras 106 to 108 but also the raw image data obtained by image capturing. Therefore, even in the case where an unexpected event or trouble has occurred in a production device, the possibility of solving the problem increases and thus the production system can be operated stably.

To be noted, by performing data analysis similar to what has been described above, for example, images and IoT information of IoT devices that have been obtained may be ranked in the external recording device 113 and the nonvolatile storage device 310 by using usefulness or the like of the information as a measure. For example, a low rank is set for information and captured image data having low relevance as a result of tendency analysis. By performing such ranking, for example, it is possible to perform a sequentially deleting data starting from a piece of data with a lower rank when the external recording device 113 or the nonvolatile storage device 310 are close to full. As a result of this, the amount of information of big data that tends to increase without a limit can be suppressed.

Second Exemplary Embodiment

FIGS. 4 to 7 illustrate a second exemplary embodiment of a production system including a smart camera. In the first exemplary embodiment described above, each component of the production line communicates with the smart cameras via a wired network system. In contrast, in the second exemplary embodiment, a stereo smart camera 403 capable of using wireless communication is used. In addition, the stereo smart camera 403 operates with a chargeable battery, and the battery is configured to be charged when the stereo smart camera 403 is placed on a cradle 407.

Figure 4:
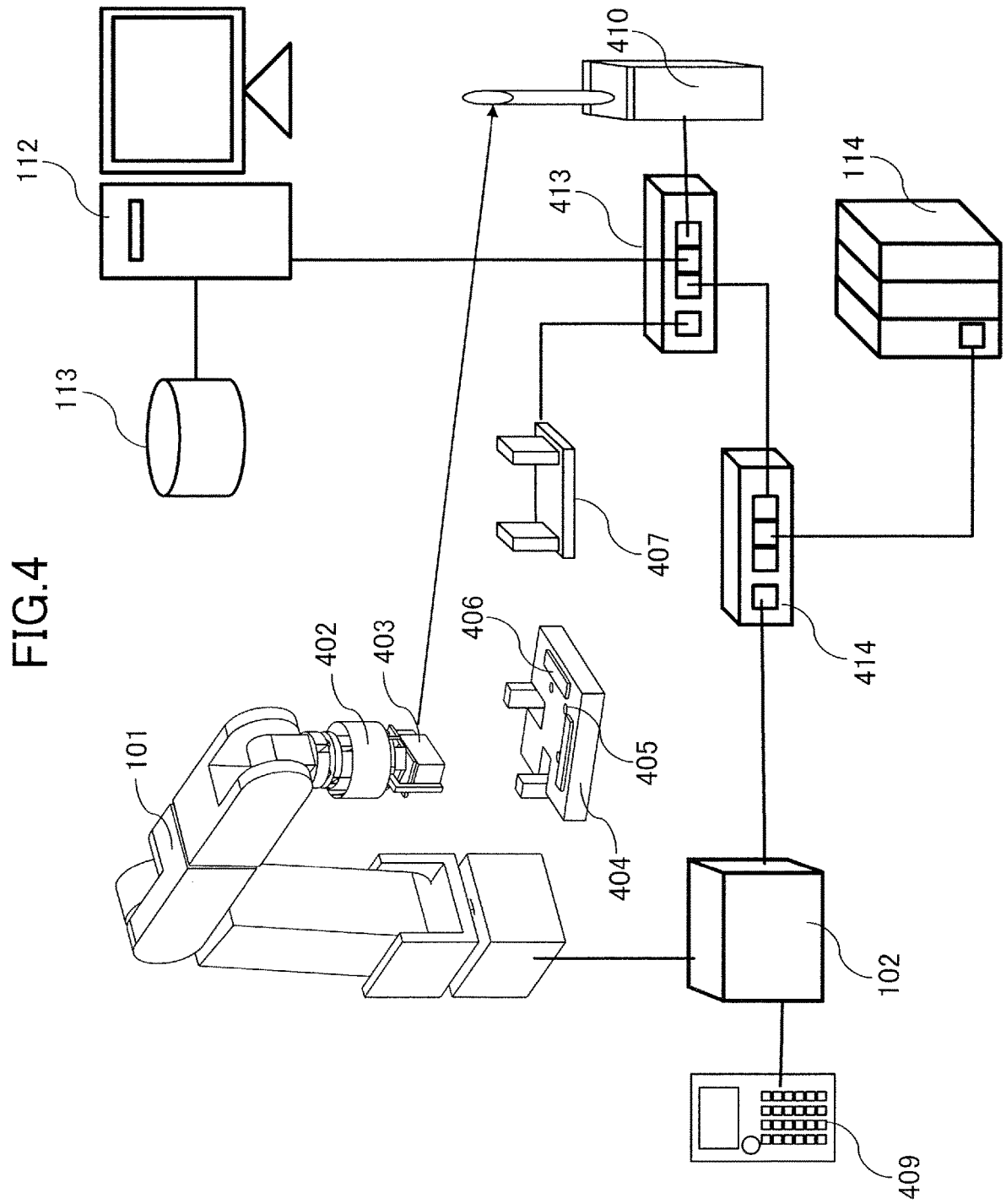
FIG. 4 is an explanatory diagram illustrating an exemplary configuration of a production system of a second exemplary embodiment of the present invention.

FIG. 4 illustrates an overall configuration of the production management system of the second exemplary embodiment in the same manner as FIG. 1. A robot arm 101 including a hand 402 as a holding apparatus is provided as one production device. Although not illustrated in FIG. 4, the production line may also include production devices such as another robot arm and the conveyance apparatus 103 illustrated in FIG. 1.

In the second exemplary embodiment, the position and orientation of the stereo smart camera 403 that can be operated wirelessly at the time of image capturing can be controlled by; for example, the hand 402 of the robot arm 101. That is, the stereo smart camera 403 is held by the hand 402 of the robot arm 101 when image capturing is needed, and the position and orientation thereof is controlled for capturing an image of, for example, a workpiece, a marker, a barcode, or another production device that is not illustrated. Then, when finishing an image capturing mode and transitioning to an image capturing suspension mode, the stereo smart camera 403 can be transferred to and placed on the cradle 407 by the robot arm 101 serving as a holding apparatus. In the first exemplary embodiment described above, the image capturing period and the image capturing suspension period are switched by a control device. However, in the case where a cradle can be used as in the second exemplary embodiment, the image capturing period and the image capturing suspension period can be switched by using the cradle. For example, a detection mechanism for the cradle 407 is provided in each of the smart cameras 106 to 108, and control is performed such that the smart camera transitions to the image capturing period when being removed from the cradle and transitions to the image capturing suspension period when being placed on the cradle.

To be noted, the same reference signs are assigned to members that are the same as or equivalent to members in the first exemplary embodiment described above, and redundant description will be omitted unless the description is particularly necessary.

Figure 6:
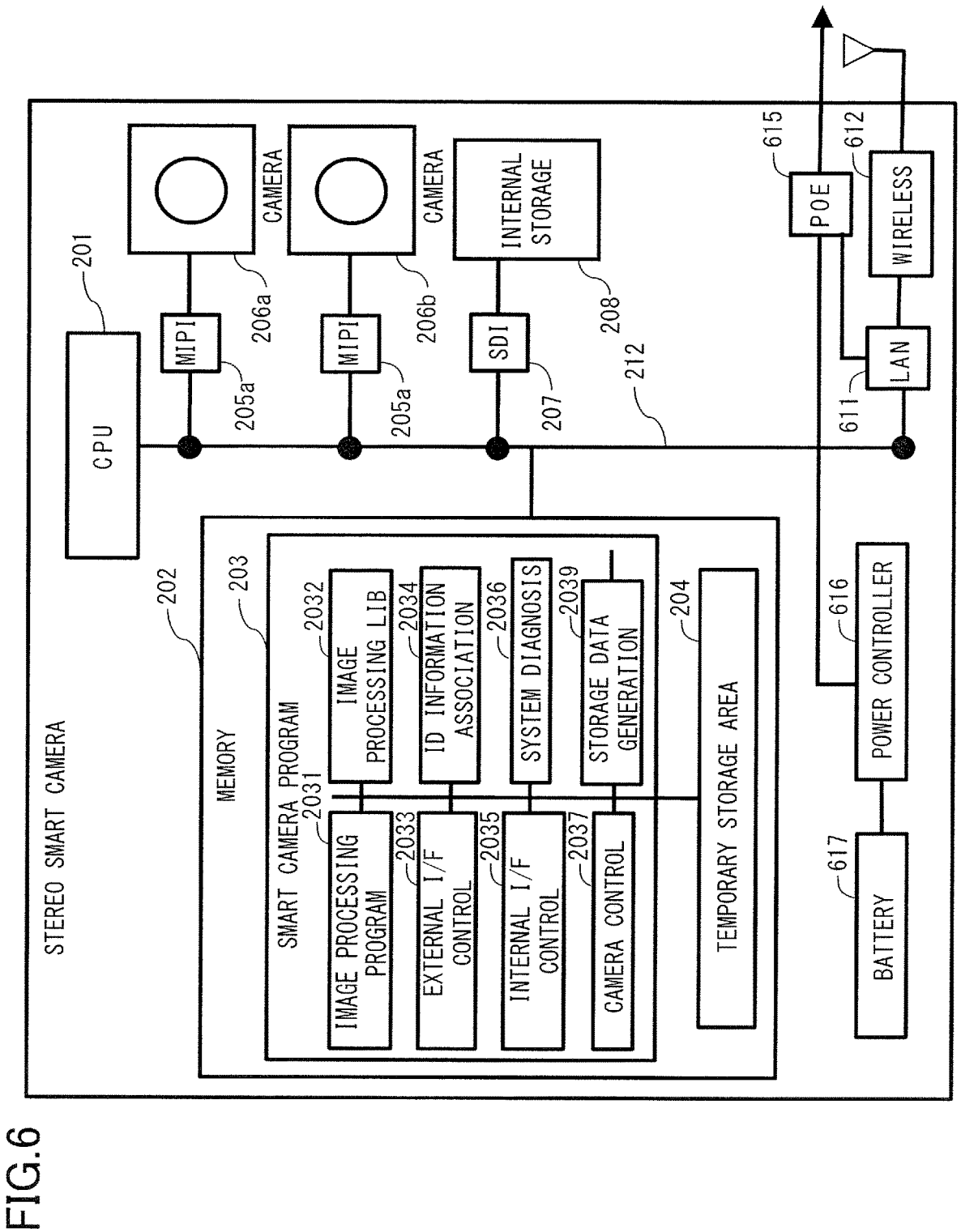
FIG. 6 is an explanatory diagram illustrating a configuration of the smart camera of FIG. 4.

The stereo smart camera 403 includes at least two cameras 206a and 206b of FIG. 6 as image capturing portions, and is capable of performing position measurement such as three-dimensional measurement and depth measurement.

The robot arm 101 handles an unillustrated workpiece that is a target of production on a working table 404. The working table 404 is provided with a marker 405 and a barcode 406. The marker 405 is provided for controlling the position and orientation of the robot arm 101 during operation. The barcode 406 includes a value unique to a process corresponding to the working table 404.

Similarly to the first exemplary embodiment, the robot arm 101 is controlled by the control apparatus 114 via the robot arm control apparatus 102. The control apparatus 114 is, for example, a PLC that controls the entirety of a production device. In addition, the robot arm 101 can be operated in real time via a pendant 409 that receives a manual operation of an operator, and teaching and adjustment of the operation of robot can be performed by the motion of the pendant 409.

In the image capturing suspension period, the stereo smart camera 403 is placed on the cradle 407, and is connected to a wired LAN of the system via the cradle 407 while charging the battery in the stereo smart camera 403 via the cradle 407. Therefore, the transmission of image data to the data management server 112 in the image capturing suspension period can be performed via the cradle 407.

Similarly to the first exemplary embodiment described above, the production system of FIG. 4 includes the data management server 112 and the control apparatus 114. The data management server 112 is connected to the external recording device 113 having a large capacity, and the control apparatus 114 controls the entirety of the production device described above.

The data management server 112, the control apparatus 114, and the robot arm control apparatus 102 are interconnected by a network of a wired LAN formed via LAN hubs 413 and 414. For example, the wired LAN is IEEE 802.3. The LAN hub 413 is connected to a WiFi station 410 for performing wireless communication with the stereo smart camera 403 in accordance with, for example, the IEEE 802.11 standard.

The configurations of the control apparatus 114 constituted by a PLC controller or the like and the robot arm control apparatus 102 are the same as in the first exemplary embodiment. The control apparatus 114 provides an operation instruction for each step to the robot arm 101 and the hand 402 via the robot arm control apparatus 102.

The robot arm control apparatus 102 includes robot teaching data instructed and generated in advance by, for example, the pendant 409 for teaching, and causes the robot arm 101 to perform an operation defined by an instruction from the control apparatus 114 for each step.

In addition, the robot arm control apparatus 102 transmits output values of various sensors included in the robot to the data management server 112 via the wired LAN described above similarly to the first exemplary embodiment. Examples of the output values include temperature, an encoder value, and a force sensing value.

Figure 5:
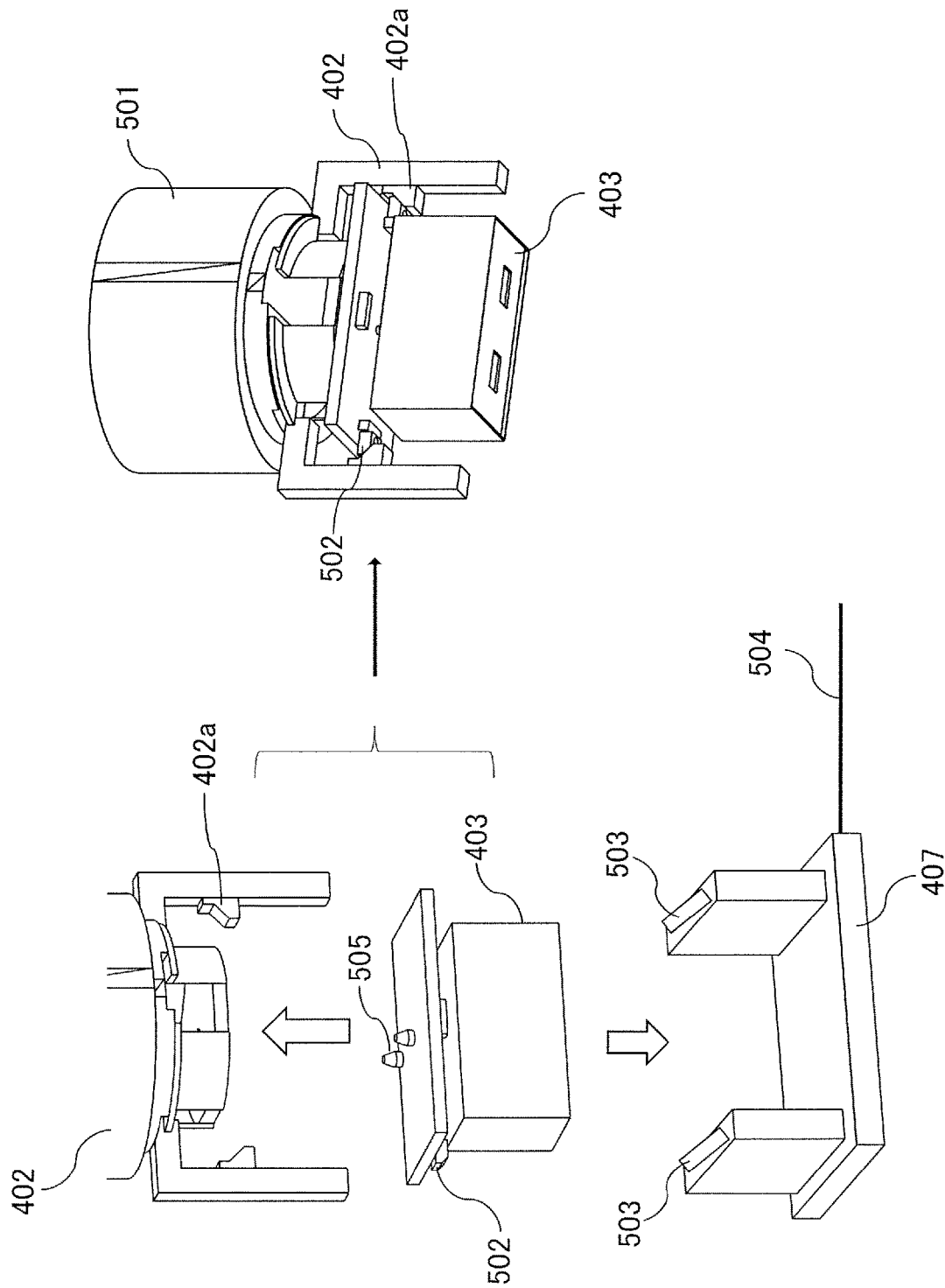
FIG. 5 is an explanatory diagram of a smart camera, a hand of a robot apparatus serving as a production device, and a cradle on which the smart camera is placed during suspension in the system of FIG. 4.

FIG. 5 illustrates the stereo smart camera 403, the cradle 407, and the hand 402 of the robot arm 101 that handles the stereo smart camera 403. The stereo smart camera 403 is placed on the cradle 407 in the image capturing suspension period of not performing image capturing. The cradle 407 is provided with contacts 503, and, while the stereo smart camera 403 is placed on the cradle 407, fixed contacts 502 of the smart camera 403 are in contact with the contacts 503, thus the battery therein is charged, and the stereo smart camera 403 is connected to the wired LAN described above. To be noted, although two contacts 503 are illustrated in FIG. 5, the number and arrangement pattern of terminals used for charging and connection to the wired LAN can be arbitrarily selected.

In contrast, when performing image capturing of a workpiece or the vicinity of the working table 404, that is, in the image capturing period described above, the control apparatus 114 controls the robot arm 101 to cause the hand 402 to hold the stereo smart camera 403, remove the stereo smart camera 403 from the cradle 407, and control the position and orientation of the stereo smart camera 403 for image capturing.

The illustration on the right side of FIG. 5 corresponds to a state in which the hand 402 is holding the stereo smart camera 403. In this state 501, a bottom surface of the stereo smart camera 403 is positioned with respect to the hand 402 by a projection 505 provided on a rear surface of the smart camera 403 that is illustrated on the left side of FIG. 5. Meanwhile, the hand 402 holds a part corresponding to the fixed contacts 502 of the stereo smart camera 403 via, for example, projections such as claw portions 402a provided on the inner surface of the hand 402. As described above, for example, the position and orientation of the hand 402 holding the stereo smart camera 403 can be guaranteed within an appropriate precision range.

In the image capturing suspension period, the hand 402 places the stereo smart camera 403 on the cradle 407 disposed at a predetermined position in the production line. In this placed state, the stereo smart camera 403 is placed such that the fixed contacts 502 are in contact with the contacts 503 of the cradle 407. A cable 504 illustrated on the left side of FIG. 5 is a power supply cable connected to the contacts 503, and is also connected to the LAN hub 414 illustrated in FIG. 4. According to this, the stereo smart camera 403 can communicate with the data management server 112 via the wired LAN in the state of being placed on the cradle 407. In addition, as described above, the fixed contacts 502 have a function of supplying power to the battery of the stereo smart camera 403.

On the working table 404 of FIG. 4, a unique number corresponding to a process management number of the working table 404 is described in the barcode 406 in advance. The stereo smart camera 403 reads the value of the barcode 406 and reads the marker 405 provided on the working table 404, and thus position measurement can be performed.

A position measurement value of the working table 404 captured and measured by the stereo smart camera 403 is transmitted to the data management server 112 by wireless communication via the wireless WiFi station 410 by using, as the ID information, the barcode value, that is, the process management number, that has been read from a captured image. In addition, the barcode value, that is, the process management number serving as the ID information and the position measurement value are transmitted to the robot arm control apparatus 102 of FIG. 4 and/or to the control apparatus 114.

According to this, the robot arm control apparatus 102 of FIG. 4 can specify the actual position of the working table 404 via the measured position of the marker 405, and thus can calculate the deviation between the position at which a robot hand is supposed to be and a current teaching position. Accordingly, by using the actual position information of the working table 404, for example, a teaching point position taught by the pendant 409 can be automatically corrected.

Such position measurement using a vision system, that is, the stereo smart camera 403, is also effective in the case of replacing the hand 402 or measuring the amount of deviation of a hand position when the body or hand of the robot arm 101 has interfered with, in other words, crashed with the working table 404 or the like. By using such a vision system, that is, the stereo smart camera 403, for example, a teaching point can be automatically corrected with a high precision after an operator roughly teaches the motion of the robot. In addition, the teaching point can be appropriately corrected also in the case where there is a distortion in the hand 402 caused by replacement of a part or crash, and thus work of an operator can be reduced greatly.

FIG. 6 illustrates a configuration of the stereo smart camera 403 in the same format as FIG. 2 of the first exemplary embodiment. In FIG. 6, the same reference sips are used for members the same as or equivalent to members in FIG. 2, and the description thereof is omitted. In the description below, only different elements will be described.

The configuration of FIG. 6 is different from FIG. 2 in that the two cameras 206a and 206b are used as image capturing portions in a stereo configuration and that the illustration of the ID generation portion 210 constituted by the RTC and the like in FIG. 2 is omitted because the barcode 406 is used as the ID information. However, the ID generation portion 210 constituted by the RTC and the like may be disposed in the stereo smart camera 403 similarly to the case of FIG. 2. In addition, in the stereo smart camera 403 of FIG. 6, the configuration related to the network is different from the configuration of FIG. 2 as described below.

The cameras 206a and 206b that perform stereo photography are connected to the CPU 201 respectively via MIPI interfaces 205a and 205b similarly to what has been described above. Particularly in the case where a plurality of cameras are provided like this, a low-cost configuration can be realized by employing an MIDI interface that has a low power consumption and a relatively simple structure. The configuration around the internal storage 208 is the same as in FIG. 2.

The configuration related to the network of the stereo smart camera 403 of FIG. 6 includes a LAN controller 611 that controls a power over Ethernet: POE 615 and a wireless LAN device 612. When the stereo smart camera 403 is placed on the cradle 407, the POE 615 is connected to the wired network via the contacts 503 of the cradle 407 and the fixed contacts 502 of the stereo smart camera 403, and power is supplied to a power controller 616 of the stereo smart camera 403 via the POE 615.

Each component of the stereo smart camera 403 of FIG. 6 is operated by power from a battery 617 in a state in which the stereo smart camera 403 is removed from the cradle 407. This battery 617 is a chargeable battery, and is charged in accordance with, for example, the amount of remaining charge, by using the power supplied to the power controller 616 via the POE 615 in a state in which the stereo smart camera 403 is placed on the cradle 407.

In FIG. 6, the configuration of the smart camera program 203 of the memory 202 is almost the same in a block scale. However, the operations of portions 2031 to 2039 including program modules, sub routines, and kernel services are different to some extent. The configuration or basic operation of each portion of these programs 2031 to 2039 will be described below.

At the time of activating the production system, the stereo smart camera 403 of FIG. 4 is in a standby state in which the stereo smart camera 403 is placed on the cradle 407. In this state, the battery 617 of the stereo smart camera 403 of FIG. 6 is charged and the stereo smart camera 403 is connected to the wired LAN via the contacts 503 and the fixed contacts 502 of FIG. 5 as described above.

When the power of the stereo smart camera 403 is turned on, a system diagnosis program 2036 is booted and performs self-diagnosis of checking the presence and absence of malfunction of each component of the stereo smart camera 403. In addition, at this time, the state of the LAN controller 611, that is, a connection state of the wired and wireless LAN and the like is checked. If no problem is found as a result of the self-diagnosis described above, the booting of the stereo smart camera 403 is notified to the control apparatus 114 and the data management server 112 by the external I/F control program 2033.

In the control apparatus 114, various operations are programmed in advance for the production devices and the stereo smart camera 403 for each process number, and all operations of the hand 402 and the stereo smart camera 403 are controlled by; for example, the control apparatus 114.

In the present exemplary embodiment, although the timekeeping information may be used as the ID information similarly to what has been described above, for example, management of devices is performed by using the process management number that can be obtained via the barcode 406 as the ID information. The data management server 112 records what kinds of information have been output by the IoT devices such as the robot arm 101, the hand 402, and the stereo smart camera 403 by using the process management number as the ID information.

In the smart camera program 203, the image processing program 2031 that performs various different image processing in accordance with the content of inspection performed by the smart camera 403 is installed. The image processing program 2031 is described so as to be executed by using a routine of the image processing LIB 2032 that is a basic image processing program.

In the second exemplary embodiment, for example, the stereo smart camera 403 can be used for correcting the teaching data of the robot arm 101. This correction of the teaching data of the robot arm 101 is performed under the control of the control apparatus 114, that is, the PLC, as described below. This correction of teaching data of the robot arm 101 is realized by, for example, a sub program that is independent of a control program used in the main operation of the production line.

First, the control apparatus 114 controls the robot arm 101 and the hand 402 to hold the stereo smart camera 403 and thus remove the stereo smart camera 403 from the cradle 407. When the stereo smart camera 403 is removed from the cradle 407, each component of the stereo smart camera 403 is caused to transition, by the power controller 616, to a state of being driven by the battery 617, and the network connection is switched to wireless connection via the wireless WiFi station 410.

In the case of correcting teaching data, the control apparatus 114 controls the robot arm 101 to move the stereo smart camera 403 held by the hand 402 in a certain position and orientation taught by the pendant 409 or the like. The position and orientation of the stereo smart camera 403 at this time is a position and orientation in which the stereo smart camera 403 is capable of capturing an image of the barcode 406 disposed on the working table 404.

When the control apparatus 114 transmits a trigger command of instructing image capturing, the stereo smart camera 403 receives the trigger command via the wireless WiFi station 410. This reception of trigger command is detected by the external I/F control program 2033 of the stereo smart camera 403.

In accordance with the received trigger command, in the stereo smart camera 403, the camera control program 2037 operates and causes the cameras 206a and 206b to capture an image of the barcode 406 disposed on the working table 404. To be noted, in the case of decoding the barcode 406, stereo photography does not always have to be performed, and it suffices as long as one of the cameras 206a and 206b is used for the image capturing.

Image capturing data of the barcode 406 is converted into a numerical value or a string corresponding to what is described in the barcode 406 by a routine prepared in the image processing LIB 2032. In the present exemplary embodiment, the content of the barcode 406 is a process management number, and the process management number obtained via the barcode 406 is used as the ID information.

The process management number decoded from the barcode 406 is stored in the temporary storage area 204, and image capturing operation is started by transmitting an image capturing start signal to the cameras 206a and 206b via the camera control program 2037. Image data obtained by stereo photography by the cameras 206a and 206b is temporarily stored in the temporary storage area 204.

Next, the image processing program 2031 performs image processing on the image data obtained by image capturing, and the image processing result thereof is stored in the temporary storage area 204. In this image processing for correction of teaching point, a current relative position and orientation of the marker 405 of the working table 404 with respect to the stereo smart camera 403 or the hand 402 is obtained.

The ID information and image processing result stored in the temporary storage area 204 are transmitted to the wired LAN side via the wireless LAN, and are thus transmitted to the control apparatus 114 and the data management server 112. That is, the image processing result associated with the ID information is transmitted to the wired LAN side via the LAN controller 611 and the wireless WiFi device 612 as led by the external I/F control program 2033, and thus are transmitted to the control apparatus 114 and the data management server 112.

The control apparatus 114 is capable of correcting, by using the image processing result associated with the ID information, for example, the current relative position and orientation of the marker 405 of the working table 404, a trajectory data or the like of the robot arm 101 approaching the working table 404.

The ID information and the captured image before image processing stored in the temporary storage area 204 is recorded and stored in the internal storage 208 of the stereo smart camera 403 via the internal I/F control program 2035. Then, the stereo smart camera 403 returns to the standby state for the trigger.

As described above, in the second exemplary embodiment, special hardware such as the ID generation portion 210 of the first exemplary embodiment is not used, and the process management number obtained by capturing an image of the barcode 406 is used as the ID information. In addition, in this case, it can be considered that an ID generation portion is constituted by the smart camera program 203 of the cameras 206a and 206b. In this manner, the ID generation portion may be also realized by using hardware and software of the camera instead of using special hardware.

To be noted, the correction of teaching point by the sub process control described above is not directly related to the main production process, and thus the image capturing by the stereo smart camera 403 is not always performed in the order of the main production process. Therefore, a process management number corresponding to the main production process is provided on the working table 404 as the barcode 406, and by capturing an image of this barcode 406 and transmitting the result thereof to the control apparatus 114 and the data management server 112 as the ID information, association with the control operation of the main production process can be easily performed. In addition, the ID information derived from the process management number can be also used in the case of specifying teaching point data in the robot controller.

In the description above, only one working table 404, one marker 405, and one barcode 406 are mentioned. However, in the case where a plurality of working tables are prepared and a unique mark and a unique barcode are provided for each working table, correction of a plurality of pieces of teaching data can be performed in one sub process by processing similar to the processing described above.

When all sub processes of correcting teaching data are finished, the stereo smart camera 403 is moved back onto the cradle 407, the network connection is switched to the wired LAN, and at the same time, charging of the battery 617 is started. In addition, also in the case where image capturing by the stereo smart camera 403 is needed in the main production process, the image capturing period of the stereo smart camera 403 can be realized in the same control as the control described above. In addition, when causing the stereo smart camera 403 to transition to the image capturing suspension period, the stereo smart camera 403 is also placed back on the cradle 407.

The stereo smart camera 403 moved back onto the cradle 407 this time becomes capable of communicating with the data management server 112 via the wired LAN. Therefore, in this state, similarly to the first exemplary embodiment, the ID information and the raw image data accumulated in the internal storage 208 can be transmitted to the data management server 112 via the wired LAN. In the data management server 112, the image data can be accumulated in the external recording device 113 in a state of being associated with the ID information. Therefore, similarly to the first exemplary embodiment, detailed event analysis can be performed by using the ID information and raw image data when an unexpected event occurs.

To be noted, the internal storage 208 of the stereo smart camera 403 may be treated in the same manner as in the first exemplary embodiment after the ID information and the captured image are transmitted to the data management server 112.

As described above, in the second exemplary embodiment, the stereo smart camera 403 is connected to the control apparatus 114 and the data management server 112 via wireless communication in the state of being held by the hand 402 of the robot arm 101. In this manner, the stereo smart camera 403 can be operated wirelessly, for example, in the image capturing period. This has a merit that motion of each part of the robot arm 101 is not impeded by a cable, for example, in the teaching point correction operation.

In addition, in the image capturing period of the stereo smart camera 403, only transmitting the result of image processing performed inside may be transmitted in a state of being associated with the ID information is enough. Therefore, the packet length required in the wireless communication is small, and thus the image processing result associated with the ID information can be efficiently transmitted to the control apparatus 114 and the data management server 112 even in the case of using a relatively low-speed wireless LAN. In addition, since the size of the image processing result associated with the ID information is very small, the influence thereof on other wireless communication devices is very small, and thus data response of wireless communication devices is not affected.

In addition, a period after the correction of teaching point or an interval between steps of the main production process in which production devices do not operate corresponds to the image capturing suspension period in which the stereo smart camera 403 is moved back onto the cradle 407. In this state, the stereo smart camera 403 is connected to the wired network. In this state, the unprocessed image data, that is, the raw image data associated with the ID information is transmitted from the stereo smart camera 403 via the wired LAN and can be logged in the data management server 112. Of course, this operation does not affect the wireless LAN at all, and the uncompressed raw image of the stereo smart camera 403 can be transmitted to and logged into the data management server 112 in case that a trouble occurs.

To be noted, the wired and wireless communication of the stereo smart camera 403 can be activated by turning the power on both in the teaching correction period and the period of being placed on the cradle 407. However, as a matter of course, control of turning off the power of a network interface corresponding to one of the communications that is not used may be performed.

For example, it is a critical problem that the distance between optical axes of the optical systems, that is, the base line length, of the camera 206a and 206b is changed by heat generated in the stereo smart camera 403. However, according to the configuration described above, external communication time of data while the teaching point correction operation can be shortened, thus a power supply time to the network I/F that consumes much electricity during this period can be shortened, and the amount of heat generated inside can be reduced. As a result of this, the influence on the distance between optical axes of the optical systems, that is, the base line length, of the cameras 206a and 206b can be reduced, and thus the precision of measurement of the stereo smart camera 403 can be increased.

In addition, according to the second exemplary embodiment, the process management number is used as the ID information. Therefore, in the case where a trouble has occurred in a certain step, a relationship between various IoT data and captured image data and related to the step can be easily specified, searched, or sorted by using the process management number. In addition, similarly to the first exemplary embodiment described above, various analyses corresponding to the process management number can be performed by a learning system such as deep learning.

To be noted, with respect to the image processing program 2031, the storage location or its correction method of the image processing parameter are the same as described in the first exemplary embodiment. In addition, the raw image data before image processing is logged to the data management server 112 by using the process management number as the ID information. Therefore, for example, in the case where a trouble derived from the teaching data of the robot arm 101 has occurred, the data management server 112 can examine the image processing performed in the stereo smart camera 403 for correction of teaching data or the like anytime.

In addition, the image processing program 2031 of the stereo smart camera 403 and image processing parameters thereof can be updated remotely and independently or integrally. For example, the image processing program 2031 and/or an image processing parameter thereof is updated by the data management server 112 giving an update command and performing data transmission to the stereo smart camera 403. Therefore, an update program capable of receiving the update processing described above can be prepared in the smart camera program 203 of the stereo smart camera 403.

To be noted, a flow of control sequence of the image capturing period and the image capturing suspension period of a smart camera of FIG. 8 can be also implemented by the smart camera program 203 of the second exemplary embodiment almost in the same manner. In the present exemplary embodiment, the determination of whether or not the smart camera is in the image capturing mode, that is, the image capturing period, in step S11 can be performed by, for example, determining whether or not the smart camera is placed on a cradle. In addition, in the teaching data correction processing of the second exemplary embodiment, generation of ID information in step S12 and image capturing in step S13 can be also read as image capturing and decoding processing of the barcode 406 described above. Transmission of the ID information and the unprocessed raw image data in step S16 is the same as the first exemplary embodiment.

In addition, almost the same configuration can be also employed in the second exemplary embodiment concerning the data format of ID information and image processing result of FIG. 9 and the data format of ID information and uncompressed raw image data of FIG. 10. In this case, the timekeeping information of the field L1 can be time information of a time at which log recording is performed in the data management server 112. The process management number obtained via the barcode 406 and serving as the ID information of the present exemplary embodiment can be logged by, for example, using a storage position such as the field L3.

Figure 7:
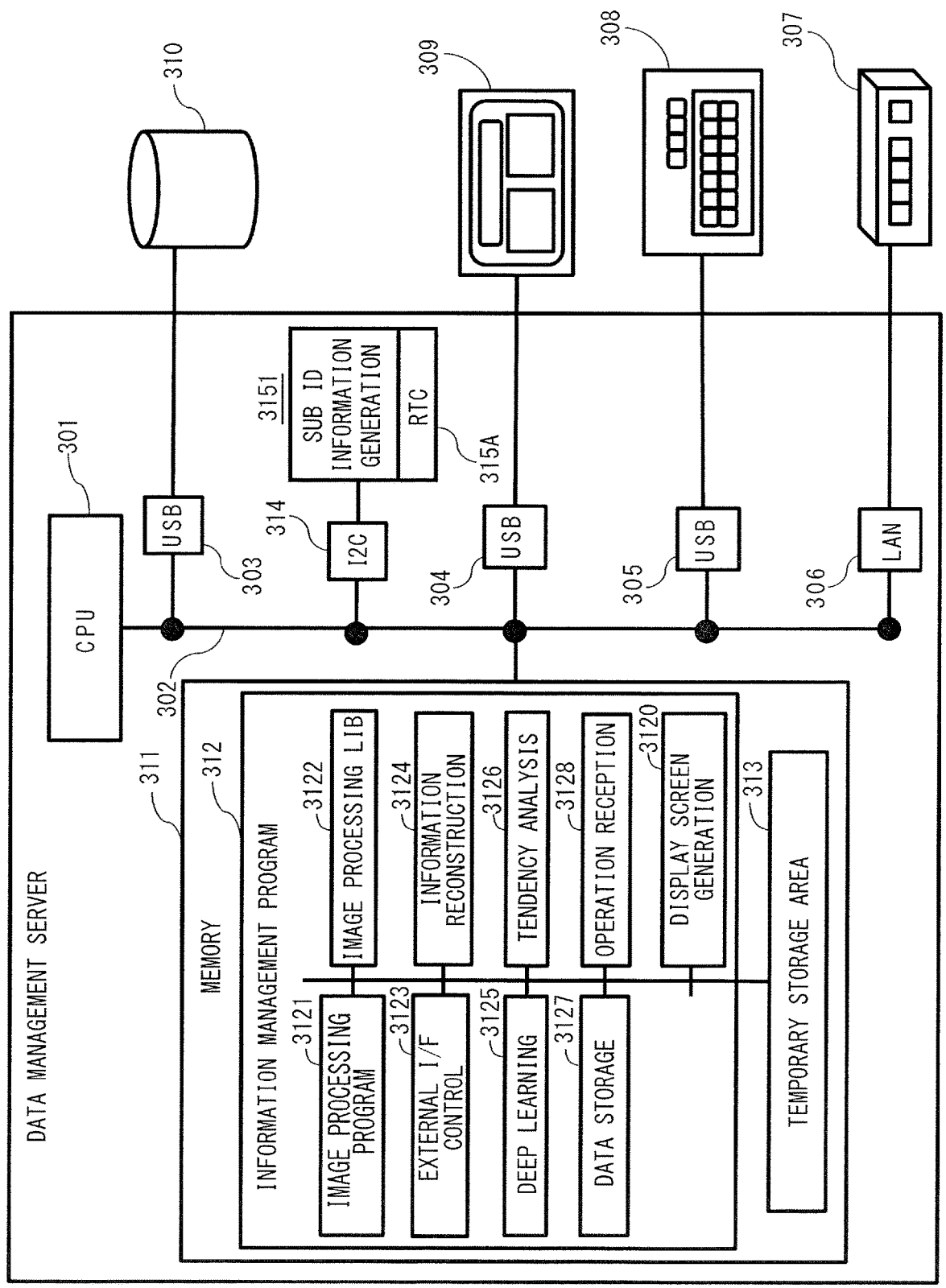
FIG. 7 is an explanatory diagram illustrating a configuration of a data management server of FIG. 4.

FIG. 7 illustrates an exemplary configuration of the data management server 112 that can be implemented in the second exemplary embodiment. The basic configuration of FIG. 7 is the same as the configuration of the data management server 112 of the first exemplary embodiment illustrated in FIG. 3. FIG. 7 is different from FIG. 3 in that the NTP server program 3129 provided in FIG. 3 for setting time of the timekeeping information serving as ID information is omitted. However, there is no problem in also providing and operating the NTP server program 3129 of FIG. 3 in the data management server 112 in the second exemplary embodiment.

In addition, in FIG. 7, a sub ID generation portion 3151 is connected to the bus line 302 via the I2C interface 314. This sub ID information generation portion 3151 can be constituted by a timekeeping device such as the RTC 315A similarly to the case of FIG. 3, and timekeeping information, that is, time information of this RTC or the like can be used as sub ID information. For example, in the second exemplary embodiment described above, a configuration in which the field L1 of FIGS. 9 and 10 is used for time of logging has been described. The timekeeping information, that is, time information, serving as the sub ID information and generated by the sub ID information generation portion 3151 can be used for the logging time of the field L1.

As described above, in the second exemplary embodiment, the process management number managed by the control apparatus 114 can be used as the main ID information for identifying IoT information and associating pieces of IoT information with each other, and the timekeeping information, that is, time information, of the RTC of the sub ID generation portion 3151 as the sub ID. Such a configuration in which main and sub ID can be used for IoT information has the following merit as compared with a configuration in which only one kind of ID information is used. For example, processing of sorting, that is, rearranging, contents of data by using the process management number serving as main ID information as a master key and information obtaining time, that is, logging time, serving as sub ID information as a sub key becomes possible. As a result of this, information of each step can be associated with one key, whether the IoT information, in other words, an event, is new or old can be clarified, and selection of information is facilitated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-103905 filed May 25, 2017, and No. 2018-04 filed Mar. 15, 2018, which are hereby incorporated by reference herein in their entirety.

What is claimed is:

1. A device comprising:
an image capturing portion configured to perform image capturing; and
an image processing portion configured to perform image processing on captured image data,
wherein the device is configured to transmit first image data corresponding to a first image and second image data corresponding to a second image after transmitting a first result and a second result, the first result being not image data but a result of image processing by the image processing portion on the first image data, the second result being not image data but a result of image processing by the image processing portion on the second image data,
wherein the device is configured to transmit the first result and the second result in a first period and to transmit the first image data and the second image data in a second period after the first period, and
wherein the image capturing portion is configured to perform image capturing in the first period and to suspend image capturing in the second period.

2. The device according to claim 1, wherein the device is configured to transmit the first result and the second result via a first network and transmit the first image data and the second image data via a second network different from the first network.

3. The device according to claim 1, wherein the first result includes a feature value of the first image data and the second result includes a feature value of the second image data.

4. The device according to claim 1, wherein the first image data includes uncompressed or raw image data corresponding to the first image, and
wherein the second image data includes uncompressed or raw image data corresponding to the second image.

5. The device according to claim 1, wherein the device is configured to obtain the first result before capturing for obtaining the second image data is performed.

6. The device according to claim 1, wherein the device is configured to transmit the first result before obtaining the second result.

7. The device according to claim 1, wherein the first image data and the second image data are obtained by the image capturing portion.

8. The device according to claim 1, wherein the image processing portion is configured to perform image processing in the first period.

9. The device according to claim 1, wherein the first period starts in response to reception by the device of a first trigger signal, and
wherein the second period ends in response to reception by the device of a second trigger signal following the first trigger signal.

10. The device according to claim 1, wherein the image processing performed, by the image processing portion, on the image data includes at least one of (a) performing pattern matching, (b) performing pattern fitting, (c) applying a median filter, (d) applying blob analysis, (e) calculating a value related to a position of a target object, (f) calculating a value related to an orientation position of a target object, (g) calculating a value related to a quality of a target object, (h) calculating a value concerning a position of a predetermined shape, serving as a mark, of a target object, and (i) calculating a value concerning presence or absence of a scratch or a defect of a target object.

11. The device according to claim 1, wherein the device is configured to transmit the first result and the first image data while associating with first ID information, and transmit the second result and the second image data while associating with second ID information.

12. The device according to claim 11, wherein the first ID information and the second ID information include timekeeping information obtained from a timekeeping portion.

13. The device according to claim 2, wherein the first network is a wireless network, and the second network is a wired network.

14. The device according to claim 1, wherein the device is configured to accumulate the first image data and the second image data after transmitting the first result and the second result.

15. A system comprising:
a device according to claim 1; and
a server configured to receive the first result and the second result transmitted from the device, and receive the first image data and the second image data transmitted from the device.

16. The system according to claim 15, wherein the server is configured to control the device on a basis of at least one of the first result, the second result, the first image data, and the second image data.

17. A system comprising:
a device according to claim 9; and a control apparatus configured to transmit the first trigger signal and the second trigger signal to the device via a network.

18. The system according to claim 15, further comprising:
a recording apparatus configured to accumulate the first image data and the second image data transmitted from the device.

19. A system comprising:
a device according to claim 7; and
a cradle on which an image capturing apparatus including the image capturing portion is placed,
wherein the image capturing apparatus is configured to be removed from the cradle when the image capturing portion performs image capturing;
wherein the image capturing portion is configured to perform image capturing in a state where the image capturing apparatus is removed from the cradle;
wherein the device is configured to transmit the first result and the second result in a state where the image capturing apparatus is removed from the cradle;
wherein the device is configured to transmit the first image data and the second image data in a state where the image capturing apparatus is placed on the cradle.

20. The system according to claim 19, wherein the image capturing apparatus placed on the cradle is charged via the cradle, and
wherein the image capturing apparatus placed on the cradle is connected to a network via the cradle.

21. A system comprising:
a server configured to communicate with a first device which comprises the device according to claim 20, and to receive the first image data corresponding to the first image and the second image data corresponding to the second image after receiving the first result of image processing on the first image data and the second result of image processing on the first image data,
wherein the system is configured to control the first device and/or a second device on a basis of the first result and the second result, and
wherein the system is configured to accumulate the first image data and the second image data.

22. The system according to claim 21, wherein the first image data and the second image data are received after the control of the first device and/or the second device based on the first result and the second result are performed.

23. The system according to claim 21, wherein the first result is not image data and the second result is not image data.

24. The system according to claim 21, wherein the first result includes a feature value of the first image data and the second result includes a feature value of the second image data.

25. The system according to claim 21, wherein the first image data includes uncompressed image data corresponding to the first image, and
wherein the second image data includes uncompressed image data corresponding to the second image.

26. The system according to claim 21, wherein the system is configured to update a control program and/or a control parameter of the first device and/or the second device on a basis of at least one of the first result, the second result, the first image data, and the second image data.

27. The system according to claim 21, wherein the system is configured to manage event data of the second device, the first result, and the first image data while associating with ID information.

28. The system according to claim 27, wherein the ID information includes at least one of timekeeping information, a management number used for controlling the second device, and an identification number for identifying a target object.

29. The system according to claim 21, wherein the second device includes a robot arm.

30. The system according to claim 21, wherein the second device includes a conveyance apparatus.

31. The system according to claim 21, wherein the system is configured to control a device configured to perform image capturing for obtaining the first image data and the second image data.

32. A method comprising:
producing a product by using the system according to claim 21,
wherein the second device includes a production device for producing the product, and
wherein the first image data and the second image data are image data capturing at least one of the production device and a target object handled by the production device.

33. A device comprising:
an image capturing portion configured to perform image capturing; and
an image processing portion configured to perform image processing on captured image data,
wherein the device is configured to transmit a first result and a second result via a first network in a first period, and
wherein the device is configured to transmit first image data corresponding to a first image and second image data corresponding to a second image via a second network different from the first network in a second period after the first period, the second period being a period after capturing for obtaining the first image data and capturing for obtaining the second image data are performed, the first result being not image data but a result of image processing by the image processing portion on the first image data, and the second result being not image data but a result of image processing by the image processing portion on the second image data, and
wherein the image capturing portion is configured to perform image capturing in the first period and to suspend image capturing in the second period.

* * * * *